(12) United States Patent
Onuki et al.

(10) Patent No.: US 6,449,081 B1
(45) Date of Patent: Sep. 10, 2002

(54) OPTICAL ELEMENT AND OPTICAL DEVICE HAVING IT

(75) Inventors: Ichiro Onuki, Kawasaki; Shigeo Ogura, Tokyo; Eriko Kawanami, Kawasaki, all of (JP)

(73) Assignee: Canon Kabushiki Kaisha, Tokyo (JP)

( * ) Notice: Subject to any disclaimer, the term of this patent is extended or adjusted under 35 U.S.C. 154(b) by 41 days.

(21) Appl. No.: 09/594,182

(22) Filed: Jun. 14, 2000

(30) Foreign Application Priority Data

Jun. 16, 1999 (JP) ............................. 11-169377
Jun. 16, 1999 (JP) ............................. 11-169657

(51) Int. Cl.[7] ............... G02F 1/03; G02B 27/10; G09G 3/16
(52) U.S. Cl. ............. 359/245; 359/252; 359/621; 359/290; 345/48
(58) Field of Search ................ 359/252, 250, 359/621, 619, 625, 290, 228, 291; 345/48, 55, 84, 85

(56) References Cited

U.S. PATENT DOCUMENTS 4,675,500 A * 6/1987 Kanz et al. ............ 219/121.73
5,659,330 A     8/1997 Sheridon
5,757,345 A     5/1998 Sheridon

FOREIGN PATENT DOCUMENTS

| JP | 3-87816 | 4/1991 |
|---|---|---|
| JP | 5-289006 | 5/1993 |
| JP | 6-167725 | 6/1994 |
| JP | 7-5497 | 1/1995 |
| JP | 7-128635 | 5/1995 |
| JP | 9-15681 | 1/1997 |
| JP | 9-236740 | 9/1997 |
| JP | 9-311643 | 12/1997 |
| WO | WO 99/18456 | 4/1999 |

* cited by examiner

Primary Examiner—Georgia Epps
Assistant Examiner—Tim Thompson
(74) Attorney, Agent, or Firm—Morgan & Finnegan, LLP

(57) ABSTRACT

An optical element has a first fluid and an electroconductive or polar, second fluid immiscible with each other, which are confined in a sealed space created between a first support and a second support. The first fluid and the second fluid have respective light transmittances different from each other. By varying a voltage applied to the second fluid, the shape of an interface between the first fluid and the second fluid is altered, so as to change an amount of light passing through the optical element.

20 Claims, 20 Drawing Sheets

V=V1

V=V2

V=V3

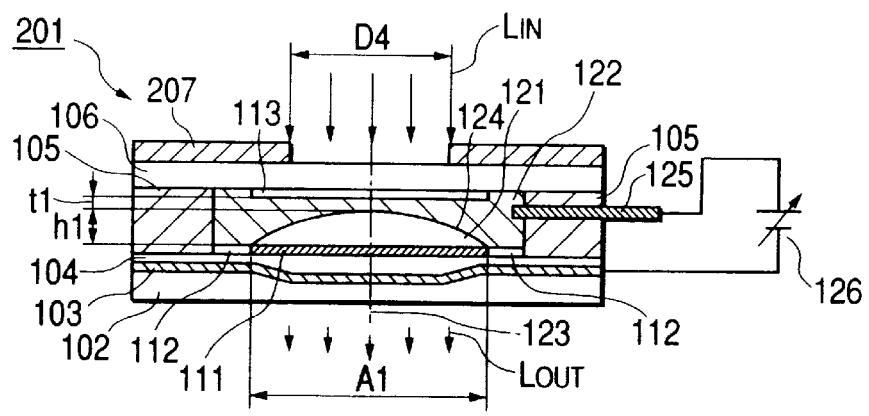
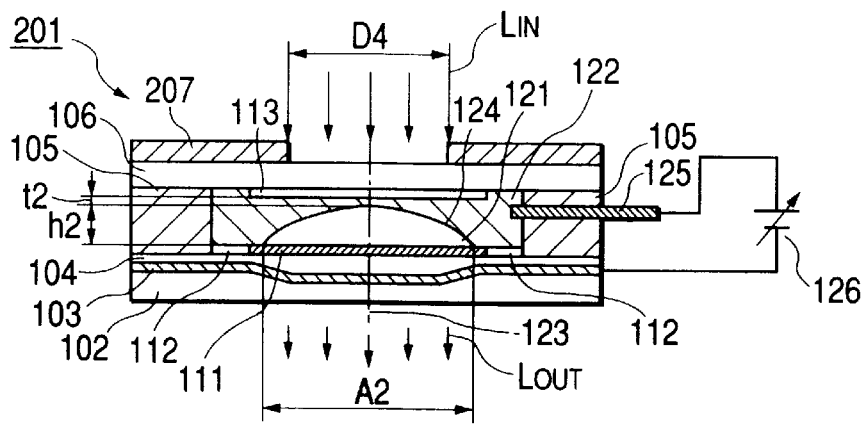
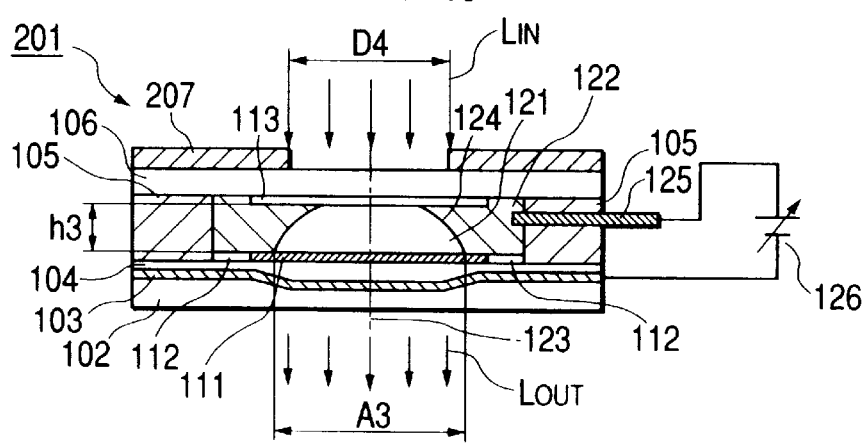

V=V1

V=V3

V=0

V=V1

V=V2 (V2>V1)

V=0

V=Vo

V=0

V=Vo

OPTICAL ELEMENT AND OPTICAL DEVICE HAVING IT

BACKGROUND OF THE INVENTION

1. Field of the Invention

The present invention relates to an optical element making use of the electrowetting phenomenon and, more particularly, to an optical element such as an optical filter capable of varying an amount of transmitted light, an optical switch capable of altering an optical path (traveling direction) of incident light, or the like.

2. Related Background Art

The electrowetting phenomenon (also called electrocapillarity) is conventionally known as a phenomenon in which interfacial tension varies with application of a voltage to a liquid to cause migration or deformation of an interface. This electrowetting phenomenon will be described referring to FIGS. 22A and 22B.

In FIGS. 22A and 22B, reference numeral 501 designates a substrate electrode, 502 an insulating layer formed on the substrate electrode 501, and 503 an electroconductive liquid droplet. FIG. 22A shows a state in which no voltage is placed between the substrate electrode 501 and the droplet 503 (V=0). When a voltage (V=V$_0$) is placed between the substrate electrode 501 and the droplet 503, as illustrated in FIG. 22B, a kind of capacitor is formed to accumulate electrostatic energy. This electrostatic energy changes the balance of surface tension of the droplet 503, whereby the shape of the droplet 503 varies from the state of FIG. 22A without application of the voltage.

The electrowetting phenomenon described is utilized in the varifocal lens disclosed in WO99/18456 and in the electrocapillary display sheet disclosed in Japanese Patent Application Laid-Open No. 9-311643. There is, however, no known example of application to the other optical elements, for example, the optical elements such as the optical filter capable of varying the amount of transmitted light, the optical switch capable of altering the optical path (traveling direction) of incident light, and so on.

SUMMARY OF THE INVENTION

An object of the present invention is to provide an optical element with a function making use of the electrowetting phenomenon, which has never been known heretofore, and, particularly, to provide an optical element such as an optical filter capable of varying the amount of transmitted light, an optical switch capable of altering the optical path (traveling direction) of incident light, or the like.

In an embodiment of the present invention for accomplishing the above object, an optical element is one suitably applicable, for example, to a variable ND filter, an apodization filter, a filter for correction for reduction of marginal light amount, and so on, which comprises a first support, a second support, a first fluid, and an electroconductive or polar, second fluid having an optical transmittance different from that of the first fluid, said first and second fluids being confined in a sealed space created between the first support and the second support, said first and second fluids being immiscible with each other, wherein by varying a voltage applied to the second fluid, the shape of an interface between the first fluid and the second fluid is altered, so as to change an amount of light passing through the optical element.

In another embodiment of the present invention an optical element is one suitably applicable, for example, to an optical switch capable of altering the optical path (traveling direction) of incident light or the like, which comprises a first support, a second support, a first fluid, and an electroconductive or polar, second fluid, said first and second fluids being confined in a sealed space created between the first support and the second support, said first and second fluids being immiscible with each other, wherein by varying a voltage applied to the second fluid, the shape of an interface between the first fluid and the second fluid is altered, so as to change an optical path of incident light entering the optical element.

BRIEF DESCRIPTION OF THE DRAWINGS

FIG. 7A, FIG. 7B, and FIG. 7C are detailed diagrams to explain the operation of an optical element of Embodiment 2;

DETAILED DESCRIPTION OF THE PREFERRED EMBODIMENTS

First, embodiments of the optical filter capable of varying the amount of transmitted light will be described. It is, however, noted that the present invention is by no means intended to be limited to only these embodiments.

[Embodiment 1]

FIG. 1 to FIG. 5 are drawings for explaining the optical element according to Embodiment 1 of the present invention.

Figure 1:
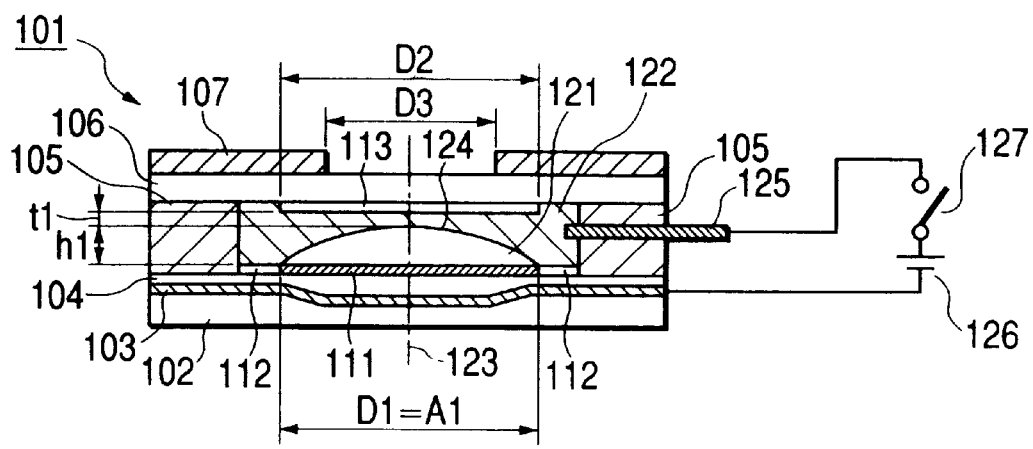
FIG. 1 is a cross-sectional view of an optical element of Embodiment 1.

FIG. 1 is a cross-sectional view to show the structure of the optical element in Embodiment 1 of the present invention.

The structure of the optical element and a production method thereof in the present embodiment will be described below referring to FIG. 1.

Numeral 101 designates the whole of the optical element of the present invention and 102 a transparent substrate of transparent acrylic resin having a recess in the center.

A transparent electrode of indium tin oxide (ITO) 103 is formed by sputtering on the upper surface of the transparent substrate 102, and an insulating layer 104 of transparent acrylic resin is formed in contact with the upper surface of the electrode 103.

The insulating layer 104 is formed by dropping the replica resin into the center of the transparent electrode 103, pressing a glass sheet thereonto to smooth the surface, and thereafter exposing the resin to UV light to cure it. A cylindrical vessel 105 with a shielding property is bonded and fixed to the upper surface of the insulating layer 104, a cover sheet 106 of transparent acrylic resin is bonded and fixed to the upper surface of the vessel 105, and a stop sheet 107 having an aperture of the diameter D3 in the central part is further placed on the upper surface of the cover sheet 106.

In the above structure, a housing is formed with a sealed space or liquid chamber of a predetermined volume surrounded by the insulating layer 104, vessel 105, and upper cover 106.

The wall surfaces of the liquid chamber are treated by a surface treatment described below.

First, a water-repellent agent is delivered into the range of the diameter D1 on the central area of the upper surface of the insulating layer 104 to form a water-repellent film 111 thereon. The water-repellent agent is preferably one selected from fluorine compounds and the like. A hydrophilic agent is also delivered into the range outside the diameter D1 on the upper surface of the insulating layer 104 to form a hydrophilic film 112 thereon.

The hydrophilic agent is preferably one selected from surfactants, hydrophilic polymers, and so on. On the other hand, the lower surface of the cover sheet 106 is treated by a hydrophilic treatment within the range of the diameter D2, to form a hydrophilic film 113 having the property similar to that of the hydrophilic film 112. All the components described heretofore have the rotationally symmetric shape with respect to the optical axis 123. Further, a hole is made in part of the vessel 105 and a rodlike electrode 125 is inserted into the hole. Then the hole is sealed with an adhesive to maintain the hermetic sealing of the liquid chamber. A power supply 126 is connected to the transparent electrode 103 and to the rodlike electrode 125, whereby a predetermined voltage can be placed between the two electrodes according to control of switch 127.

Two types of liquids described below are charged into the liquid chamber of the above structure. First, a predetermined amount of the first liquid 121 is dropped onto the water-repellent film 111 on the insulating layer 104. The first liquid 121 is silicone oil which is colorless and transparent and which has the specific gravity of 0.85 and the refractive index of 1.38 at room temperature.

On the other hand, the second liquid 122 is charged into the rest space in the liquid chamber.

The second liquid 122 is an electroconductive electrolyte which is made by mixing water and ethyl alcohol at a predetermined ratio and further adding a predetermined amount of salt thereto and which has the specific gravity of 0.85 and the refractive index of 1.38 at room temperature. In addition, an achromatic, water-soluble dye, for example carbon black or a titanium oxide base material, is further added to the second liquid 122. Namely, the first and second liquids selected are the liquids which are immiscible with each other and which have the substantially equal specific gravities and refractive indexes, but have different ray absorptive powers. Therefore, the two liquids form an interface 124 and do not intermix, so that the liquids exist independent of each other.

Next, the shape of the interface will be described.

First, when no voltage is applied to the second liquid, the shape of the interface 124 is determined by the interfacial tension between the two liquids, the interfacial tension between the first liquid and the water-repellent film 111 or the hydrophilic film 112 on the insulating layer 104, the interfacial tension between the second liquid and the water-repellent film 111 or the hydrophilic film 112 on the insulating layer 104, and the volume of the first liquid.

In the present embodiment, the materials are selected so as to make the interfacial tension relatively smaller between the silicone oil being the material of the first liquid 121, and the water-repellent film 111.

Namely, since wettability is high between the two materials, the outer edge of the lens-shaped droplet of the first liquid 121 tends to expand and becomes stabilized when the outer edge coincides with the coating area of the water-repellent film 111. In other words, the diameter A1 of the bottom surface of the droplet of the first liquid is equal to the diameter D1 of the water-repellent film 111.

On the other hand, since the specific gravities of the two liquids are equal as described previously, the gravity does not act. Therefore, the interface 124 becomes spherical and the radius of curvature and the height h1 thereof are determined by the volume of the first liquid 121.

The thickness of the second liquid is t1 on the optical axis. On the other hand, when the switch 127 is brought to the closed position to apply the voltage to the second liquid 122, the electrocapillarity decreases the interfacial tension between the second liquid 122 and the hydrophilic film 112, so that the second liquid moves over the border between the hydrophilic film 112 and the water-repellent film 111 into the area of the water-repellent film 111.

Figure 2:
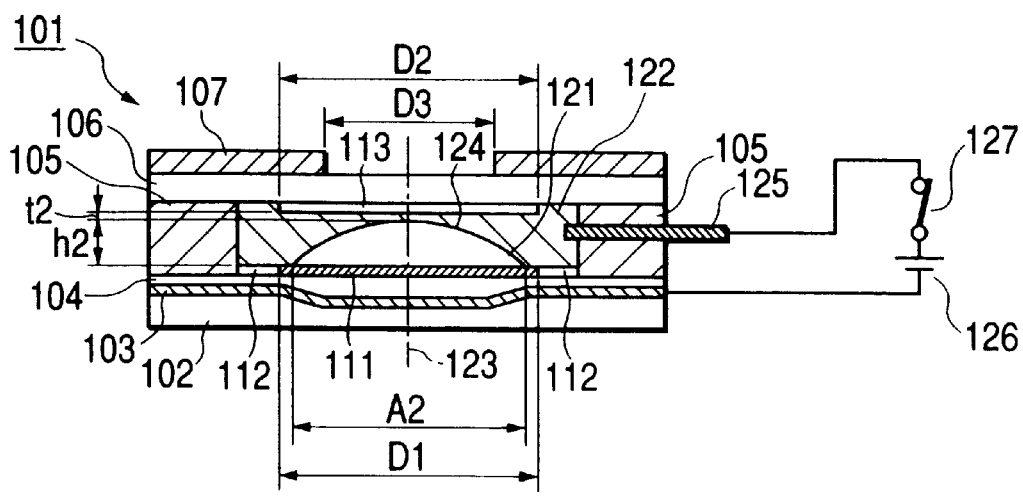
FIG. 2 is a diagram to explain the operation with application of the voltage to the optical element of Embodiment 1.

As a result, as illustrated in FIG. 2, the diameter of the bottom surface of the droplet of the first liquid 121 decreases from A1 to A2 and the height thereof increases from h1 to h2.

The thickness of the second liquid 122 becomes t2 on the optical axis. As described, the balance of interfacial tension between the two types of liquids varies depending upon the application of voltage to the second liquid 122, so as to alter the shape of the interface between the two liquids.

The first liquid 121 is substantially transparent, whereas the second liquid 122 has the predetermined ray absorptive power because of the light-absorbing material added thereto. Therefore, when light is incident through the aperture of the stop plate 107, the light is absorbed by amounts according to optical path lengths where the light travels through the second liquid 122. This decreases the intensity of the light emerging from the transparent substrate 102. Namely, a decrease rate of light intensity is proportional to the thickness of the second liquid on the optical axis (t1 of FIG. 1 or t2 of FIG. 2). This substantiates the optical element capable of freely varying the transmitted light amount by altering the shape of the interface 124 according to the voltage control of the power supply 126. Since the refractive indexes of the first and second liquids are substantially equal to each other, the incident light is modified only in the intensity of emerging light, without changing the direction thereof.

Next, the operation of the above optical element used as a variable ND filter will be described in further detail, based on FIGS. 3A to 3C.

Figure 3A:
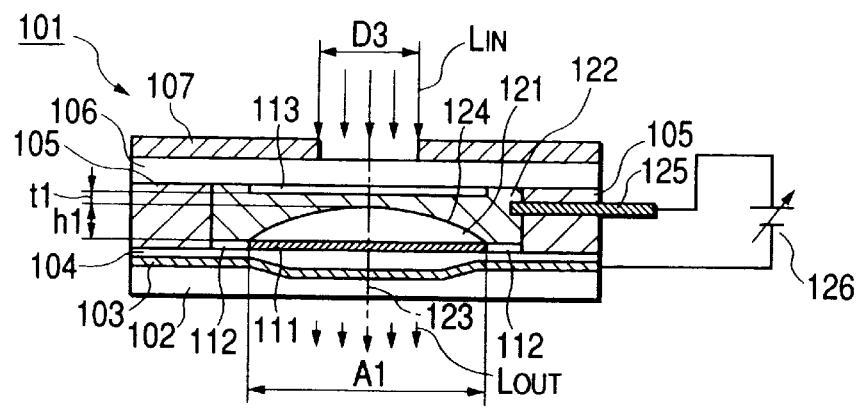
FIG. 3A, FIG. 3B, and FIG. 3C are detailed diagrams to explain the operation of the optical element of Embodiment 1.

FIG. 3A shows a situation in which the output voltage of the power supply 126 connected to the optical element 101 is V1 equal or close to zero.

The shape of the interface 124 at this time is the same as illustrated in FIG. 1, the diameter of the bottom surface of the lens formed of the first liquid 121 is A1, and the height thereof is h1.

The thickness on the optical axis of the second liquid is t1. $L_{IN}$ represents light coming from above the optical element 101 and entering the aperture of the stop 107, and $L_{OUT}$ light emerging from the optical element 101.

A ratio of the light $L_{OUT}$ to $L_{IN}$ is the transmittance of the optical element 101, and the transmittance at this time is low, because the thickness t1 on the optical axis of the second liquid is large.

The light amount distribution of the output light $L_{OUT}$ demonstrates decrease in the light amount with increase in the distance from the optical axis, i.e., with increase in the incident height, but the light amount distribution of the output light $L_{OUT}$ can be regarded as almost uniform, because the aperture diameter D3 of the stop 107 is smaller than the diameter A1 of the bottom surface of the droplet formed of the first liquid 121. Namely, optical path lengths of respective rays passing through the aperture of the stop 107 and then through the first liquid 121 and the second liquid 122 are approximately (substantially) equal, independent of the positions where the rays pass in the aperture.

Figure 3B:
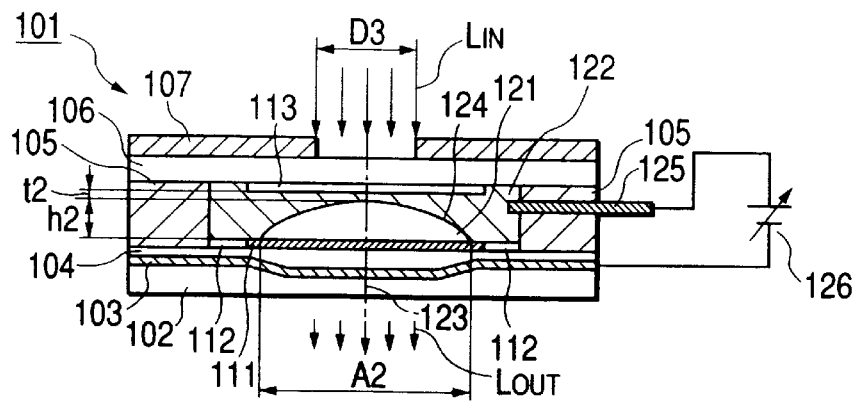

FIG. 3B shows a situation in which the output voltage of the power supply 126 is V2 greater than V1. At this time, the diameter of the bottom surface of the droplet of the first liquid 121 is A2 and the height is h2.

The thickness on the optical axis of the second liquid 122 is t2 smaller than t1 of FIG. 3A. The transmittance of light is thus greater than that in the case of FIG. 3A.

Figure 3C:
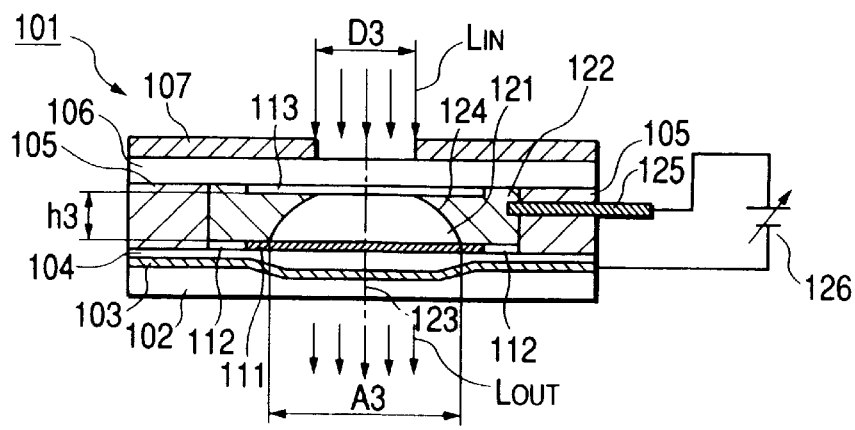

FIG. 3C shows a situation in which the output voltage of the power supply 126 is V3 further greater than V2. At this time, the diameter of the bottom surface of the droplet of the first liquid 121 is reduced to A3 and the top of the interface 124 becomes flat in contact with the hydrophilic film 113 formed on the bottom surface of the cover sheet 106.

Then the diameter of this flat part is equal to or larger than the diameter D3 of the aperture of the stop 107. As a result, the thickness on the optical axis of the second liquid 122 is zero and thus the transmittance is further greater than in the case of FIG. 3B.

With further increase in the output voltage of the power supply 126 thereafter, there appears no change in the shape of the interface 124 inside the aperture of the stop 107. Therefore, the transmittance is kept constant where the optical element is used as a variable ND filter. The transmittance at this time is expressed by the product of the transmittances of the transparent substrate 102, transparent electrode 103, insulating layer 104, water-repellent film 111, first liquid 121, hydrophilic film 113, and cover sheet 106.

When the applied voltage of the power supply 126 is switched from the state of FIG. 3C back to V1, the interfacial tension between the two liquids returns to the initial value. At this time, the wettability is good between the second liquid 122 and the hydrophilic film 113, while the wettability is poor between the first liquid 121 and the hydrophilic film 113. Therefore, the first liquid 121 moves away from the hydrophilic film 113 back to the state of FIG. 3A. Namely, the shape alteration of the interface 124 of the optical element is reversible against the variation of applied voltage.

Figure 4:
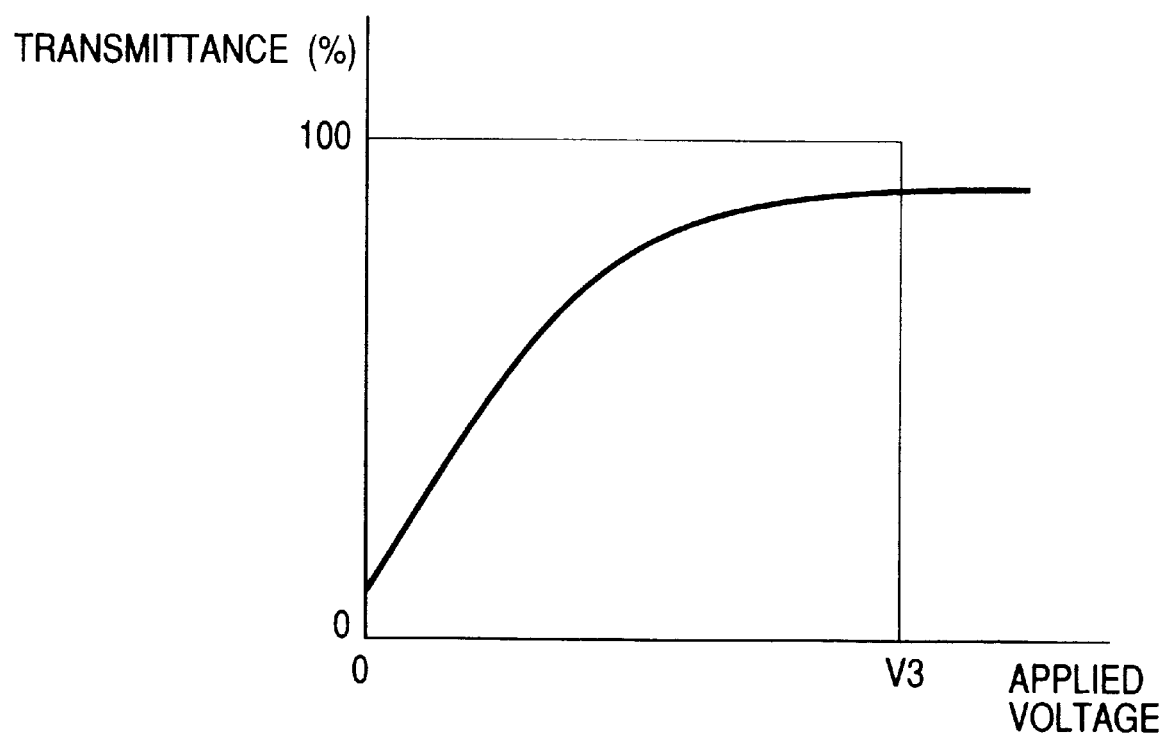
FIG. 4 is a diagram to explain the transmittance of the optical element of Embodiment 1.

FIG. 4 shows the relationship of ray transmittance of the optical element 101 against voltage applied to the optical element 101. By "transmittance" in FIG. 4 is here meant the "average value of transmittance" of the entire area within the diameter D3. The transmittance continuously increases with increase in the applied voltage and the variation of transmittance becomes saturated when the applied voltage arrives at V3.

Figure 5:
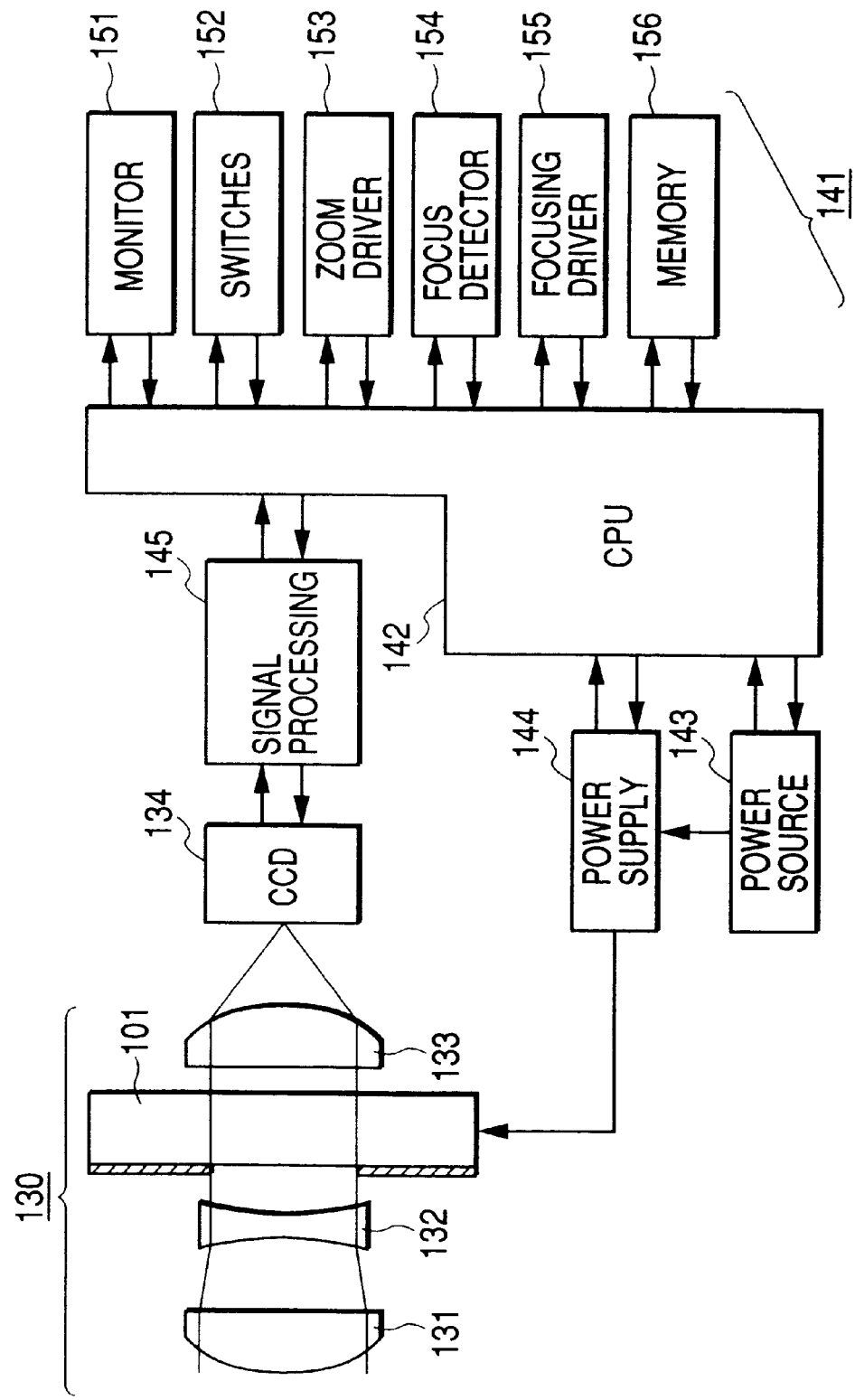
FIG. 5 is a diagram to show the structure of a photographing device incorporating the optical element of Embodiment 1.

FIG. 5 shows an application example of the optical element 101 to the photographing apparatus.

In the present embodiment, the photographing device 141 will be described as an example of a so-called digital still camera constructed to photoelectrically convert a still image to electrical signals by image pickup means and record them as digital data.

Numeral 130 denotes a photographing optical system consisting of a plurality of lens units, which are a first lens unit 131, a second lens unit 132, and a third lens unit 133.

The focus is adjusted by moving the first lens unit 131 back and forth in the optical-axis directions.

Zooming is effected by moving the second lens unit 132 back and forth in the optical-axis directions.

The third lens unit 133 is a relay lens unit which is fixed.

The optical element 101 is disposed between the second lens unit 132 and the third lens unit 133.

The image pickup means 134 is placed at the focal-point position (intended image plane) of the photographing optical system 130. This means is a photoelectric conversion means such as a two-dimensional CCD sensor or the like consisting of a plurality of photoelectric conversion portions for converting optical energy of incident light into charge, charge storage portions for storing the charge, and a charge transfer section for accepting the charge transferred thereto and transmitting the charge to the outside.

Numeral 142 represents a central processing unit (hereinafter referred to as CPU) for controlling the operation of the entire photographing device, which is a one-chip microcomputer having the ROM, RAM, EEPROM, A/D conversion function, and D/A conversion function. Numeral 143 indicates a power source for supplying power to the CPU 142 and to various circuits and actuators in the photographing device.

Numeral 144 denotes a power supply means for applying the voltage to the optical element 101, which correspond to the power supply 126 of FIG. 1. The power supply means 144 outputs a desired voltage according to a control signal from the CPU 142.

Numeral 145 designates an image signal processing circuit which performs A/D conversion of analog image signals supplied from the photoelectric conversion means 134 and then performs image processing thereof, such as the AGC control, white balance, γ correction, edge enhancement, and so on.

Numeral 151 denotes a monitor such as a liquid crystal display or the like, which displays an object image acquired by the photoelectric conversion means 134 and the operation circumstances of the photographing device.

Numeral 152 represents control switches, which include a main switch for activating the CPU 142 from a sleep state to a program execution state, a photograph preparation switch, a photograph start switch, a photograph condition setting switch for setting of shutter speed or the like, and so on.

Numeral 153 denotes a zoom driver which consists of an actuator and a driver circuit for moving the second lens unit 132 back and forth in the optical-axis directions and which performs the zooming operation according to photographer's manipulation on a zoom switch to vary the focal length of the photographing optical system 130. Numeral 154 represents a focus detector which is preferably a phase difference detection type focus detecting means or the like used in single-lens reflex cameras.

Numeral 155 indicates a focusing driver which consists of an actuator and a driver circuit for moving the first lens unit 131 back and forth in the optical-axis directions and which performs the focusing operation based on a focus signal computed by the focus detector 154 to adjust the focus condition of the photographing optical system 130.

Numeral 156 stands for a memory, which saves image signals of taken images. Specifically, the memory 156 is preferably a detachable PC card type flash memory or the like.

Next, the action of the optical element 101 in the present embodiment will be described below.

The dynamic range of luminance of objects existing in nature is very wide and, in order to set it in a predetermined range, it is common practice to provide the photographing optical system with a mechanical stop mechanism inside and adjust the amount of photograph light.

However, it is hard to make the size of the mechanical stop mechanism smaller and the resolving power of object image is degraded by diffraction of light at the edge of stop wings in a small stop state where the stop aperture is small.

When the optical element 101 is used as a variable ND filter replacing the above mechanical stop mechanism as in the present embodiment, the amount of light passing through the photographing optical system can be adjusted in a proper range, without experiencing the above drawbacks.

Figure 6:
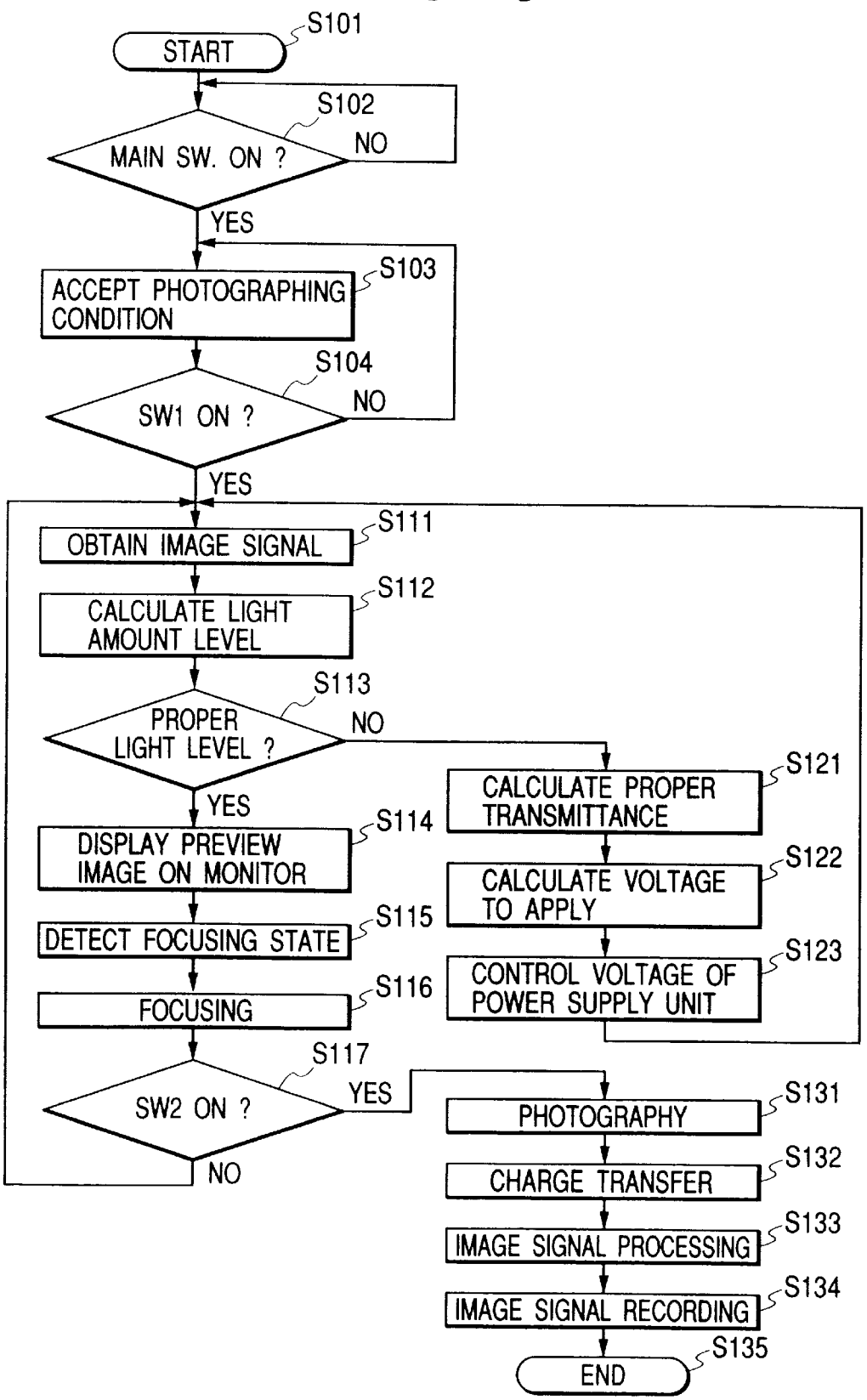
FIG. 6 is a control flowchart of the photographing device incorporating the optical element of Embodiment 1.

FIG. 6 is a control flowchart of the CPU 142 which the photographing device 141 illustrated in FIG. 5 has. The control flow of the photographing device 141 will be described below referring to FIG. 5 and FIG. 6.

Through step S101, the CPU goes to step S102 to determine whether the photographer switches the main switch on. The CPU stays at step S102 as long as the main switch is off.

Once it is determined in step S102 that the main switch becomes on, the CPU 142 leaves the sleep state to execute the processes in and after step S103.

In step S103 the CPU accepts photographing conditions set by the photographer. Specifically, the photographer sets an exposure control mode (shutter priority AE, program AE, etc.), an autofocus mode (one shot AF, continuous AF, etc.), a drive mode (single shot, continuous shots, etc.), an image quality mode (the number of recording pixels used, an image compression rate selected, etc.) and so on by use of the monitor 151 and the control switches 152.

In step S104 the CPU determines whether the photographer switches the photograph preparation switch (denoted by SW1 in the flowchart) on. As long as the photograph preparation switch is off, the CPU goes back to step S103 to accept the set photographing conditions repeatedly. Once it is determined in step S104 that the photograph preparation switch becomes on, the CPU leaves step S104 to execute the processes in and after step S111.

In step S111 the CPU drives the image pickup means 134 and signal processing circuit 145 to acquire a preview image. The preview image is an image which is acquired before photography in order to permit proper setting of the photographing conditions for a finally recorded image and permit the photographer to capture the photographing composition.

In step S112 the CPU determines a light amount level of the preview image acquired in step S111.

Specifically, the CPU calculates maximum, minimum, and average output signal levels of the image signals outputted from the image pickup means 134 and determines the amount of incident light to the image pickup means 134.

In step S113 the CPU determines whether the light amount level determined in step S112 above is proper.

If it is judged as proper in this step, the CPU moves to step S114.

In step S114 the preview image acquired in step S111 is displayed on the monitor 151.

Then the CPU goes to step S115 to detect the focus condition of the photographing optical system 130 by use of the focusing detector 154. In next step S116 the CPU makes the focus driver 155 drive the first lens unit 131 back and forth in the optical-axis directions so as to perform the focusing operation. After that, the CPU proceeds to step S117 to determine whether the photograph switch (denoted by SW2 in the flowchart) becomes on.

As long as the photograph switch is off, the CPU goes back to step S111 to repeatedly carry out the steps from the acquirement of preview image to the focusing.

When it is determined in step S113 on the other hand that the light amount level judged in step S112 above is not proper, the CPU jumps to step S121.

In step S121 the CPU compares the actual light amount level with the proper light amount level and calculates the proper transmittance of the optical element 101 in the photographing optical system 130.

In step S122 the CPU calculates the control voltage for achieving the proper transmittance calculated in step S121 above. Specifically, since the ROM of the CPU 142 stores a look-up table indicating the relation of transmittance against applied voltage illustrated in FIG. 4, the CPU references the table to determine the applied voltage against the transmittance calculated in step S121.

In step S123 the CPU controls the output voltage of the power supply means 144 so as to apply the voltage acquired in step S122 above to the optical element 101. After execution of step S123, the CPU returns to step S111 to repeatedly carry out the steps from the acquisition of preview image to the power supply control before the level of incident light to the image pickup means 134 becomes proper. Once the level of incident light to the image pickup means 134 becomes proper, the CPU transfers from step S113 to step S114.

When the photographer switches the photograph switch on during the repetitive execution of the photograph preparation operation as described above, the CPU jumps from step S117 to step S131. In step S131 the CPU performs the image pickup operation. Specifically, the object image formed on the image pickup means 134 is photoelectrically converted to store the charge proportional to the intensity of optical image in the charge storage section in the vicinity of each photoreceptive portion. In step S132, the charge stored in step S131 is read out through the charge transfer line and the analog signals thus read are supplied to the signal processing circuit 145. In step S133, the signal processing circuit 145 performs the A/D conversion of the analog image signals accepted and the image processing including the AGC control, white balance, $\gamma$ correction, edge enhancement, and so on. Further, JPEG compression or the like is effected according to an image compression program stored in the CPU 142 if necessary. In step S134 the image signals obtained in step S133 above are stored in the memory 156 and the photographing operation is complete in step S135.

As described above, Embodiment 1 realizes the optical element or the photographing device that can present the excellent effects in the following points.

It can provide the ND filter capable of continuously controlling the light transmittance to any desired value by controlling the applied voltage to the optical element.

The use of the optical element instead of the mechanical stop mechanism of the photographing optical system permits disuse of the mechanical means such as the stop wings, stop aperture control mechanism, etc. and also permits continuous control of the level of incident light to the image pickup means, thus permitting achievement of smaller size and higher performance of the photographing apparatus.

[Embodiment 2]

In Embodiment 1 described above, the transmittance-variable optical element was described as the example of the variable ND filter, whereas Embodiment 2 is an example of a transmittance-distribution-variable filter demonstrating a transmittance distribution in which the transmittance gradually decreases with increase in the incident height (the distance from the optical axis) of the incident light to the optical element and being capable of controlling the transmittance distribution to a desired profile by controlling the applied voltage to the optical element.

FIGS. 7A, 7B, and 7C to FIG. 10 are drawings for explaining Embodiment 2 of the present invention, and FIGS. 7A to 7C are drawings for detailing the operation where the optical element of the present embodiment is used as a transmittance-distribution-variable filter.

In the present embodiment, the diameter D4 of the aperture of the stop plate 207 in the optical element 201 is set to be greater than the diameter D3 of the aperture of the stop plate 107 in Embodiment 1 and the other members in the present embodiment all have the same functions and dimensions as in Embodiment 1. Therefore, the same portions will be denoted by the same reference numerals and redundant description will be avoided.

FIG. 7A shows a situation in which the output voltage of the power supply 126 connected to the optical element 201 is V1 equal to or close to zero.

The shape of the interface 124 at this time is the same as in FIG. 3A, the diameter of the bottom surface of the droplet formed of the first liquid 121 is A1, and the height is h1.

The thickness on the optical axis of the second liquid 122 is t1. $L_{IN}$ represents the light coming from above the optical element 201 and entering the aperture of the stop 207, while $L_{OUT}$ the light emerging from the optical element 201.

Since the present embodiment has the structure in which the diameter A1 of the bottom surface of the droplet of the first liquid 121 is the same as in Embodiment 1 but the aperture diameter D4 of the stop 207 is larger than the aperture diameter D3 in Embodiment 1, the light amount distribution of the output light $L_{OUT}$ is not uniform and the amount of transmitted light considerably decreases with increase in the distance from the optical axis 123.

FIG. 7B shows a situation in which the output voltage of the power supply 126 is V2 larger than V1. At this time, the diameter of the bottom surface of the droplet of the first liquid 121 is A2 and the height is h2. An average of transmitted light amount is larger than in FIG. 7A and the nonuniformity of transmitted light amount becomes more prominent. FIG. 7C shows a situation in which the output voltage of the power supply 126 is V3 further greater than V2.

At this time, the diameter of the bottom surface of the droplet of the first liquid 121 is decreased to A3, and the top of the interface 124 becomes flat in contact with the hydrophilic film 113 formed on the bottom surface of the cover sheet 106.

The diameter of this flat part is smaller than the diameter D4 of the aperture of the stop 207. As a result, the transmittance becomes uniform in the region inside the flat part, but it gradually decreases according to the distance from the optical axis in the outside region. The transmittance at the incident height of zero at this time is expressed by the product of the transmittances of the transparent substrate 102, transparent electrode 103, insulating layer 104, water-repellent film 111, first liquid 121, hydrophilic film 113, and cover sheet 106.

Figure 8:
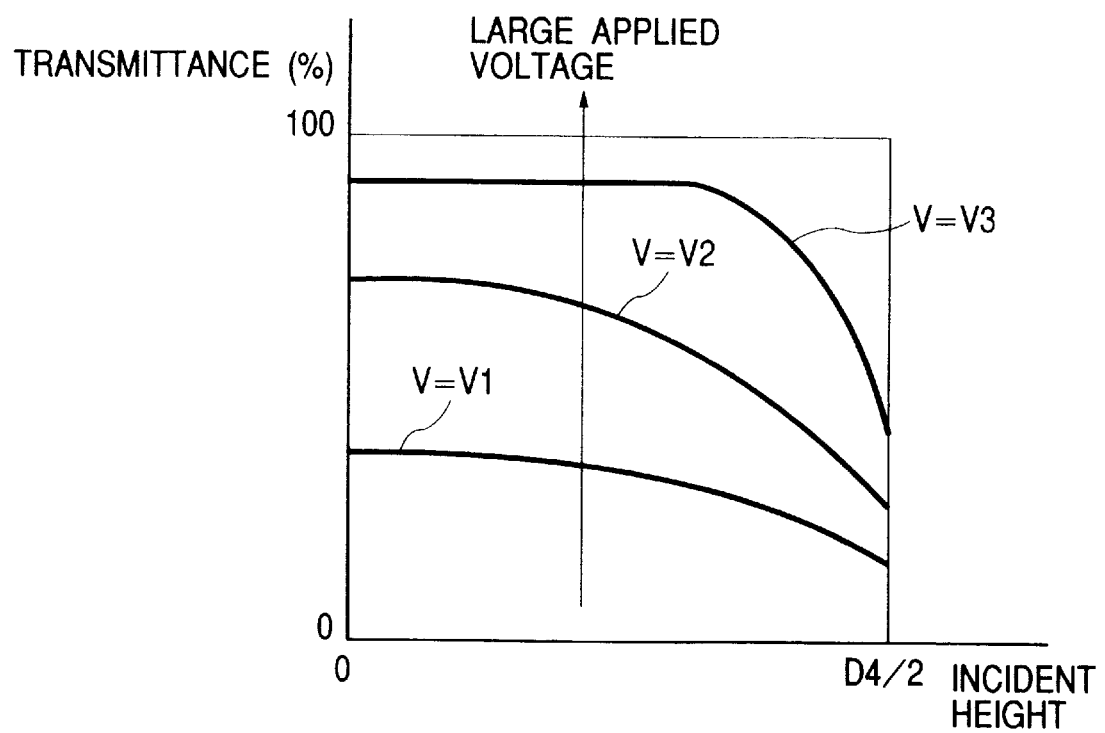
FIG. 8 is a diagram to explain the transmittance distribution of the optical element of Embodiment 2.

FIG. 8 is a diagram to show the relationship of transmittance distribution against incident height (the distance from the optical axis 123) of the incident light to the optical element 201, using the parameter of the voltage applied from the power supply 126 to the optical element 201.

With increase in the applied voltage, the average transmittance increases and absolute values of gradients also increase on the transmittance curve in which the transmittance gradually decreases with increase in the incident height.

Figure 9:
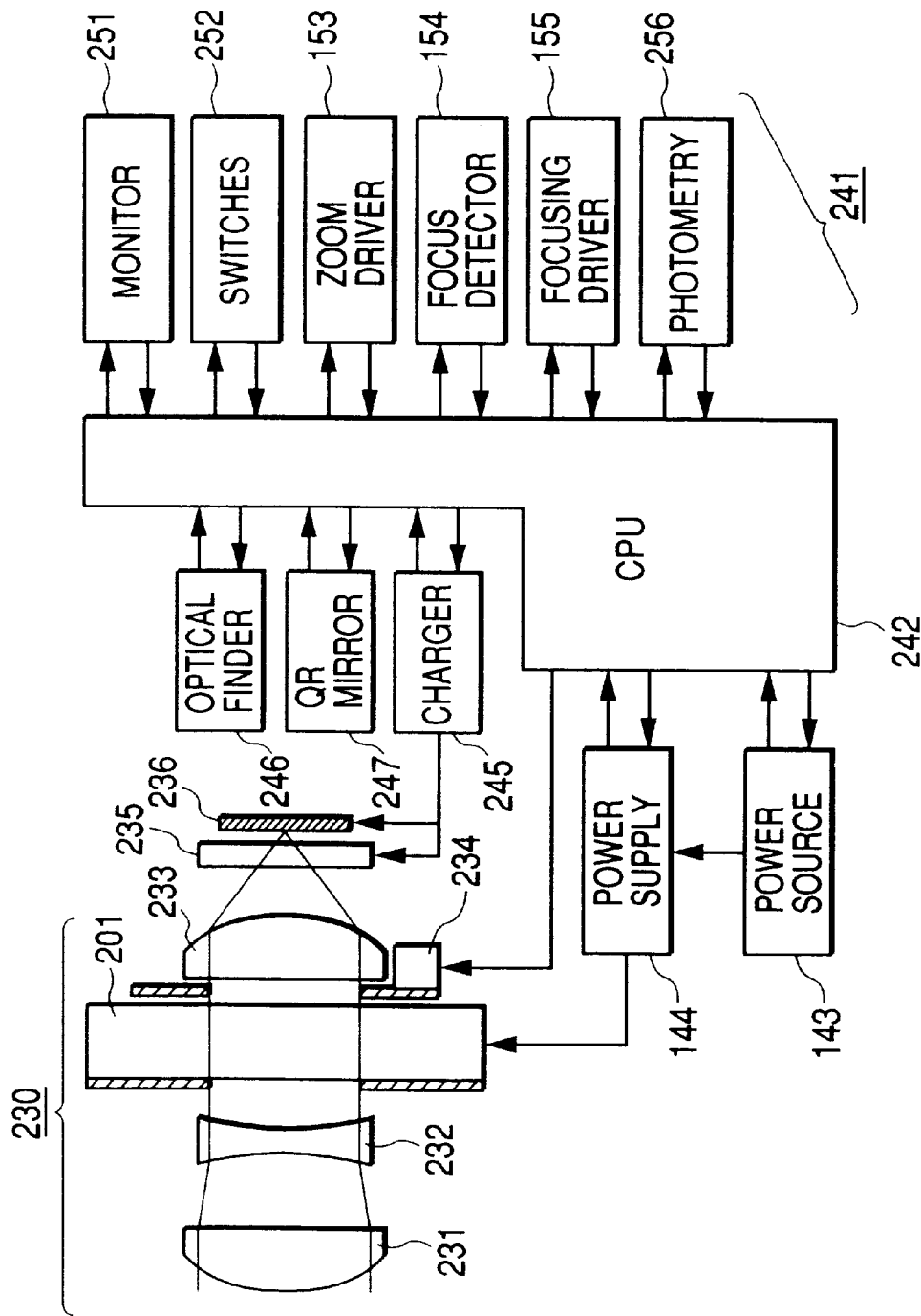
FIG. 9 is a diagram to show the structure of a photographing device incorporating the optical element of Embodiment 2.

FIG. 9 shows an application example of the optical element 201 to the photographing apparatus. In the present embodiment, the photographing device 241 will be described as an example of the so-called silver-halide film camera for projecting a still image onto a silver-halide film.

Numeral 230 designates the photographing optical system consisting of a plurality of lens units, which are a first lens unit 231, a second lens unit 232, and a third lens unit 233, the function of each of which is the same as that of each lens unit 131, 132, or 133 in the photographing device 141 in Embodiment 1 of FIG. 5.

The optical element 201 is placed between the second lens unit 232 and the third lens unit 233 and a mechanical stop mechanism 234 incorporating a stepping motor as a driving source is disposed behind the optical element 201. The silver film 236 is located at the focal point of the photographing optical system 230 and a focal-plane shutter 235 is placed immediately before it.

Numeral 242 represents the CPU for controlling the operation of the entire photographing device, which is a one-chip microcomputer having the ROM, RAM, EEPROM, and A/D and D/A conversion functions. The power source 143 and the power supply means 144 are the same as in Embodiment 1 and thus denoted by the same reference numerals. Numeral 245 indicates a mechanical charger which consists of a mechanism for charging an actuation spring of the aforementioned focal-plane shutter 235 and a rewinding mechanism for winding up the film 236. Numeral 246 designates an optical finder system for forming an image for observation of object, which is composed of a focusing screen, a pentagonal roof prism, and an eyepiece.

Numeral 247 denotes a quick return mirror disposed between the third lens unit 233 and the focal-plane shutter 235, which is composed of a movable mirror for switching of light between the path to the film 236 and the path to the finder optical system 246, and an actuator for actuating the mirror.

Numeral 251 represents the monitor such as the liquid crystal display or the like, which displays the operation circumstances of the photographing device. Numeral 252 indicates the control switches, which include the main switch for activating the CPU 242 from the sleep state to the program execution state, the photograph preparation switch, the photograph start switch, the photograph condition setting switch for setting of shutter speed or the like, and so on.

The apparatus of the present embodiment is different from Embodiment 1 in that the apparatus of the present embodiment has an apodization effect input switch described hereinafter.

The zoom driver 153, the focus detector 154, and the focusing driver 155 have the same functions as those in Embodiment 1 and thus are denoted by the same reference symbols.

Numeral 256 denotes a photometry means, which is comprised of a photometry sensor disposed in the middle of the finder optical system 246 and an output amplifier for amplifying output of the sensor.

Next, the action of the optical element 201 in the present embodiment will be described below.

When an object with some depth is imaged on the film 236 by the photographing optical system 230, the object image in focus can be represented by an assembly of point images, but the object image out of focus, so called an out-focus image, is an assembly of blurred images having finite diameters.

When the photographing optical system is an aplanatic lens system, the blurred images are circular images with uniform illuminance.

However, the practical lenses have various aberrations and consequently disturb the blurred images, for example, like a lens presenting a dirty blur effect as called off-axis aberration.

It is thus contemplated, as disclosed in Japanese Patent Application Laid-Open No. 9-236740, that an optical element, called an apodization filter the transmittance of which gradually decreases with increase in the incident height, is placed near the stop of the photographing optical system, so as to obtain a natural blurred image without incompatibility. The present embodiment accomplishes the function of the apodization filter by the optical element 201.

Figure 10:
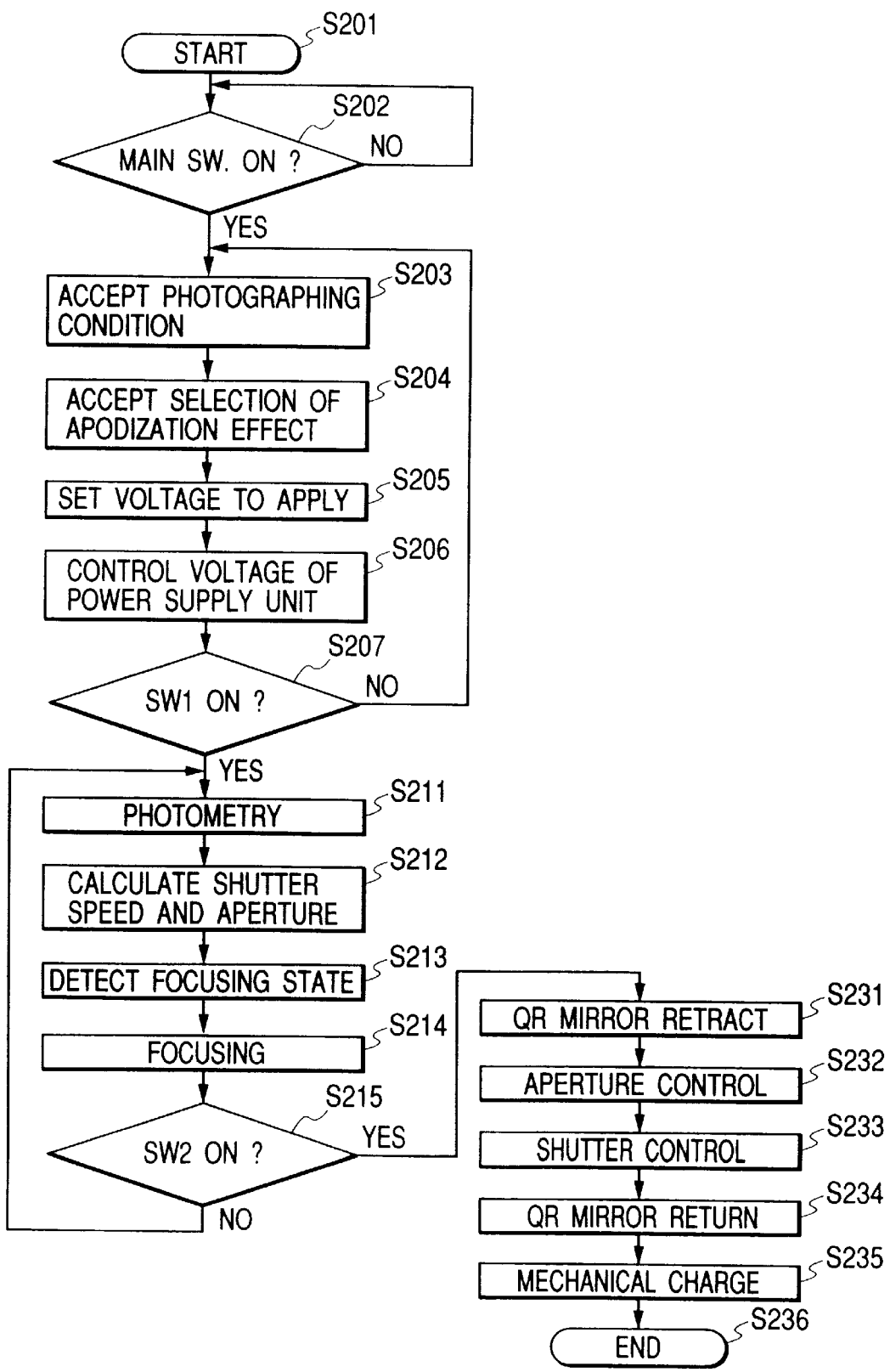
FIG. 10 is a control flowchart of the photographing device incorporating the optical element of Embodiment 2.

FIG. 10 is a control flowchart of the CPU 242 in the photographing device 241 illustrated in FIG. 9.

The control flow of the photographing device 241 will be described below referring to FIG. 9 and FIG. 10.

Through step S201, the CPU goes to step S202 to determine whether the photographer switches the main switch on. While the main switch is off, the CPU stays at step S202.

When it is determined in step S202 that the main switch becomes on, the CPU 242 leaves the sleep state to execute the processes in and after step S203.

In step S203 the CPU accepts the photographing conditions set by the photographer. Specifically, the photographer sets the exposure control mode (shutter priority AE, program AE, etc.), the autofocus mode (one shot AF, continuous AF, etc.), the drive mode (single shot, continuous shots, etc.) and so on by use of the monitor 251 and the control switches 252.

In step S204 the CPU accepts selection of the apodization effect by the photographer. Specifically, the photographer selects an apodization level by use of the monitor 251 and the apodization effect selection switch among the control switches 252. Specifically, one apodization level can be selected from the levels of "1" to "3". The apodization effect becomes more prominent as the level number increases.

In step S205 the CPU calculates the applied voltage corresponding to the apodization level selected in step S204 above. Specifically, when level 1 is selected, the applied voltage to the optical element 201 is set to V1. Likewise, the applied voltage is set to V2 with selection of level 2 and to V3 with selection of level 3.

In step S206, the voltage set in step S205 above is supplied from the power supply means 144 to the optical element 201. As a result, when the photographer selects the apodization level 1, the transmittance distribution of the optical element 201 becomes the curve indicated by the applied voltage V=V1 in FIG. 8. Similarly, the characteristics corresponding to the applied voltage V=V2 are obtained with selection of level 2, and the characteristics corresponding to the applied voltage V=V3 with selection of level 3.

In step S207 it is determined whether the photographer switches the photograph preparation switch (indicated by SW1 in the flowchart) on. While the photograph preparation switch is off, the CPU goes back to step S203 to repeatedly accept the setting of photographing conditions and the selection of apodization effect. When it is determined in step S207 that the photograph preparation switch becomes on, the CPU leaves step S207 to execute the processes in and after step S211.

In step S211 the luminance of object is detected by the photometry means 256. The shutter speed and aperture upon photography are calculated based on the object luminance detected and the program chart stored in the ROM. In step S213 the focus condition of the photographing optical system 230 is detected by the focus detector 154. In next step S214, the first lens unit 231 is moved back and forth in the optical-axis directions by the focus driver 155 to perform the focusing operation.

After that, the CPU goes to step S215 to determine whether the photograph switch (represented by SW2 in the flowchart) is switched on. While the photograph switch is off, the CPU goes back to step S211 to repeatedly carry out the steps from photometry to focusing.

When the photographer switches the photograph switch on during the repetitive execution of the photograph preparation operation as described above, the CPU jumps from step S215 to step S231.

In step S231 the quick return mirror 247 is retracted out of the photograph light.

In step S232 the stop 234 is controlled based on the aperture calculated in step S212.

In step S233 the focal-plane shutter 235 is actuated and controlled based on the shutter speed calculated in step S212.

In step S234 the quick return mirror 247 is returned into the photograph light and the stop 234 is also taken back into the open state.

In step S235 the charger 245 is actuated to charge the focal-plane shutter 235 into the initial state (wing-movable state) and the film 236 is wound up by one frame. Then the photographing operation is complete in step S236.

Embodiment 2 described above can substantiate the optical element or the photographing device that can present the excellent effects in the following points.

The present embodiment can provide the transmittance-distribution-variable filter capable of achieving the transmittance distribution in which the transmittance gradually decreases with increase in the incident height of the incident light to the optical element and capable of controlling the transmittance distribution to a desired profile by controlling the applied voltage to the optical element.

The present embodiment can provide the photographing apparatus capable of optionally controlling the blur effect of the out-focus image (so-called the blurred image) by placing the optical element near the stop mechanism of the photographing optical system, and thus capable of obtaining a high-quality image.

[Embodiment 3]

Embodiment 1 and Embodiment 2 described above were the examples of the filters constructed to continuously vary the transmittance, whereas Embodiment 3 shows an example of the transmittance-variable optical element applied as an optical shutter constructed to switch between a light-transmitting state and a light-intercepting state.

Figure 11A:
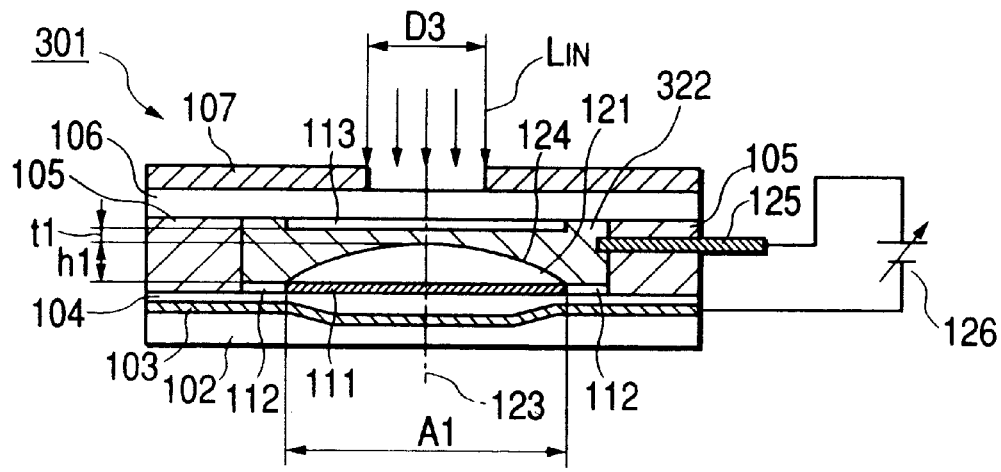
FIG. 11A and FIG. 11B are detailed diagrams to explain the operation of an optical element of Embodiment 3.
Figure 11B:
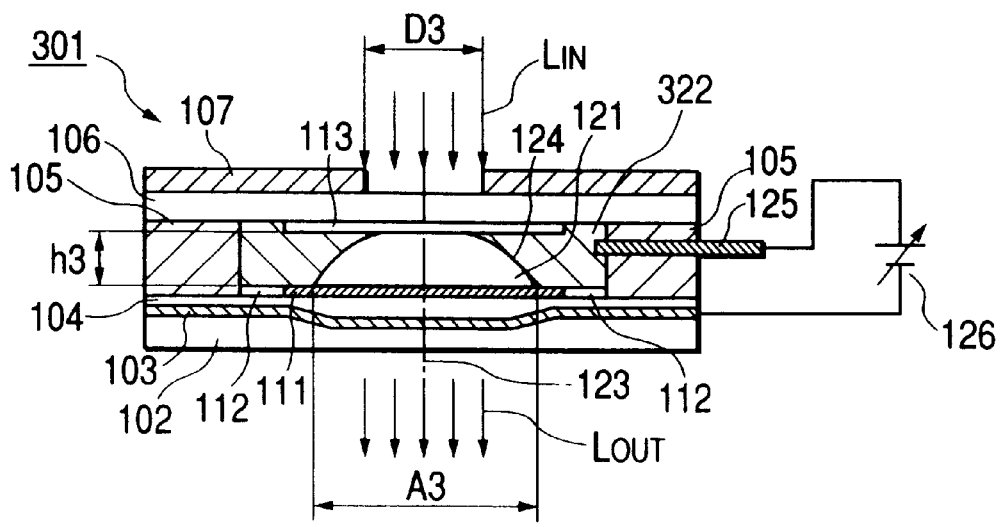

FIGS. 11A, 11B to FIG. 14 are drawings for explaining Embodiment 3 of the present invention and FIGS. 11A and 11B are diagrams to detail the operation where the optical element is used as an optical shutter in the present embodiment.

In the present embodiment, the concentration of the water-soluble dye dissolved in the second liquid 322 is greater than in Embodiment 1, so as to increase the light absorptive power. The other members all have the same functions and same dimensions as in Embodiment 1. Therefore, the same portions will be denoted by the same numbers and redundant description will be avoided.

FIG. 11A shows a situation in which the output power of the power supply means 126 connected to the optical element 301 is V1 equal to or close to zero. The shape of the interface 124 at this time is the same as in FIG. 3A, the diameter of the bottom surface of the droplet of the first liquid 121 is A1, and the height is h1. The thickness on the optical axis of the second liquid 322 is t1. $L_{IN}$ represents the light coming from above the optical element 301 and entering the aperture of the stop 107. In the present embodiment, since the light absorptive power of the second liquid 322 is very high, the amount of emerging light will become almost zero even if the thickness t1 on the optical axis of the second liquid 322 is considerably small.

FIG. 11B shows a situation in which the output voltage of the power supply means 126 is the same as V3 of FIG. 3C. In this case, the diameter of the bottom surface of the droplet of the first liquid 121 is reduced to A3 and the top of the interface 124 becomes flat in contact with the hydrophilic film 113 formed on the bottom surface of the cover sheet 106. The diameter of this flat part is larger than the diameter D3 of the aperture of the stop plate 107. As a result, the transmittance distribution becomes uniform inside the aperture diameter D3 of the stop plate 107. With further increase in the output voltage of the power supply means 126 thereafter, the shape of the interface 124 does not vary inside the aperture of the stop plate 107 and thus the transmittance is constant where the optical element is used as an optical shutter. The transmittance at this time is expressed by the product of the transmittances of the transparent substrate 102, transparent electrode 103, insulating layer 104, water-repellent film 111, first liquid 121, hydrophilic film 113, and cover sheet 106. Since the transparent materials are selected for these members, the overall transmittance is high, i.e., the optical shutter presents its open state.

Figure 12:
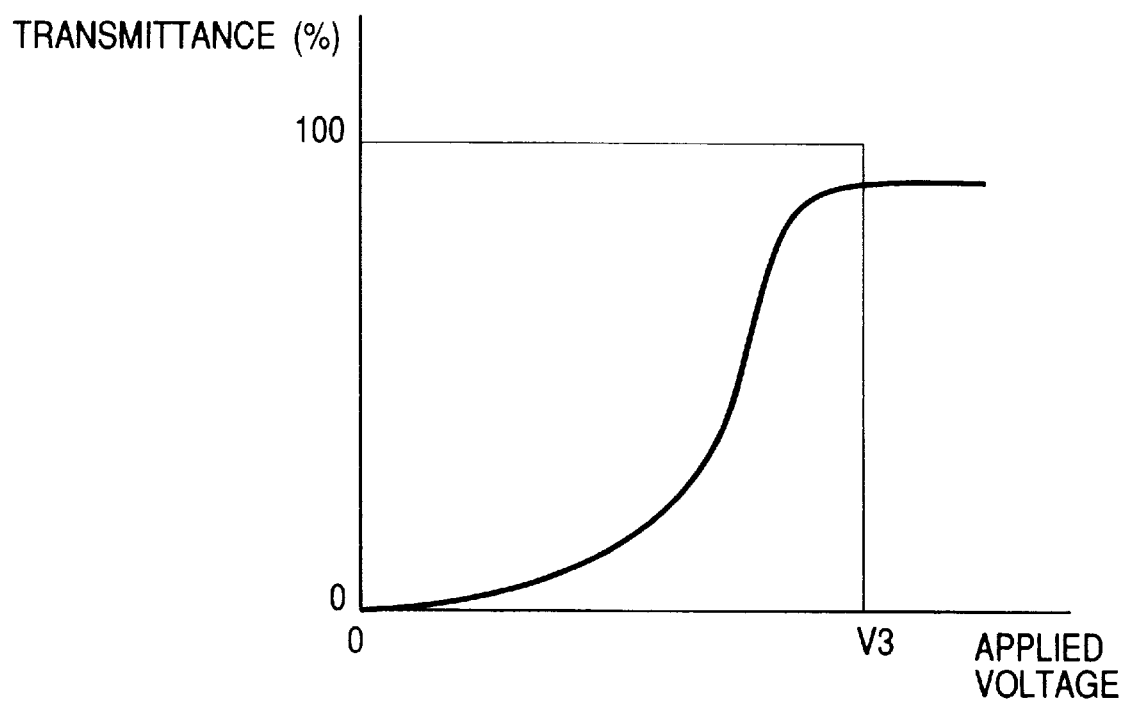
FIG. 12 is a diagram to explain the transmittance of the optical element of Embodiment 3.

FIG. 12 shows the relationship of light transmittance of the optical element 301 against applied voltage to the optical element 301.

The transmittance is approximately zero in the low range of applied voltage, the transmittance steeply increases with increase of the applied voltage, and the transmittance becomes saturated at the applied voltage of V3.

Thus the optical element serves as an optical shutter which intercepts the light in the state of very small applied voltage but transmits the light in the state of the applied voltage of V3.

Figure 13:
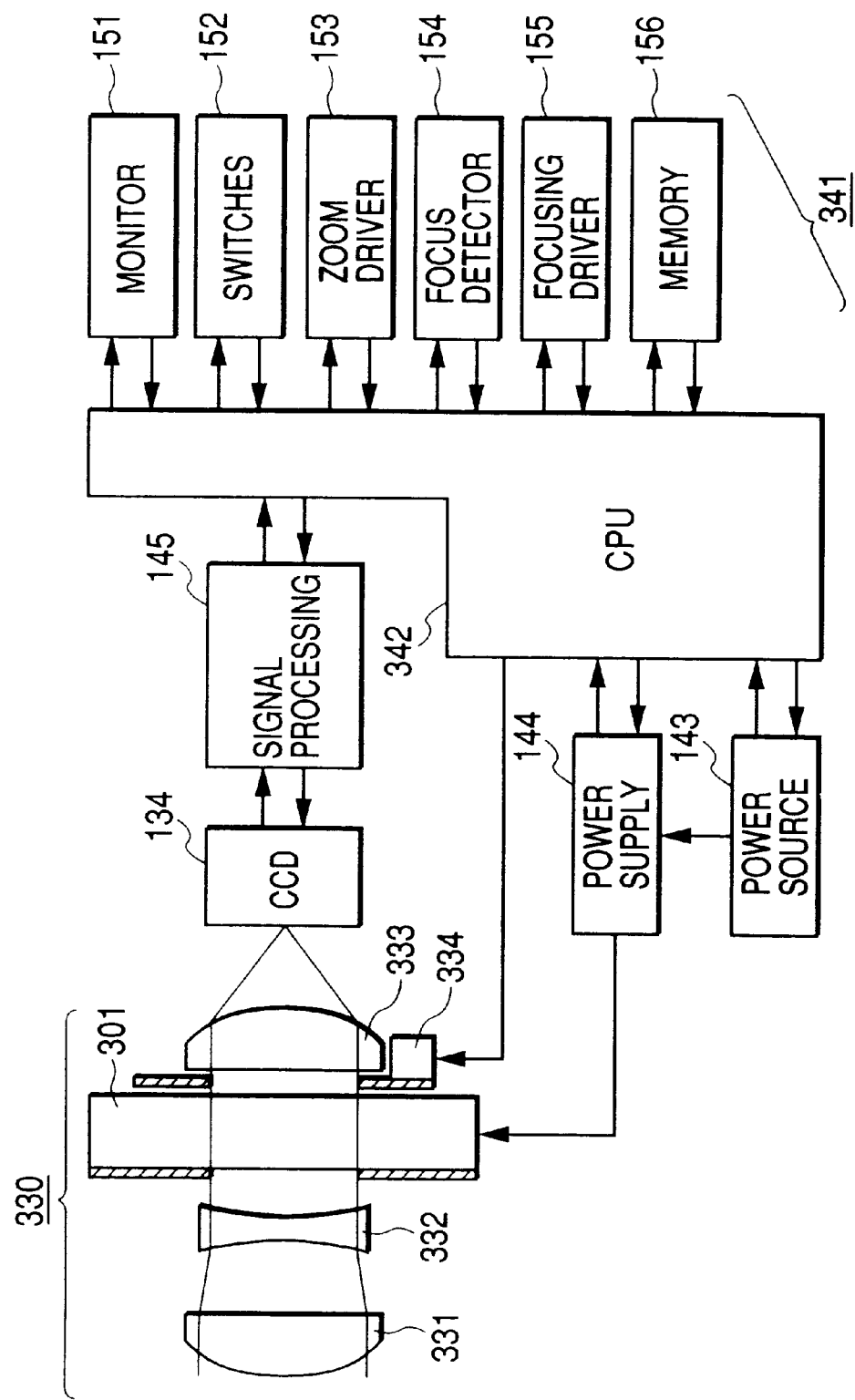
FIG. 13 is a diagram to show the structure of a photographing device incorporating the optical element of Embodiment 3.

FIG. 13 shows an application example of the optical element 301 to the photographing apparatus. In the present embodiment the photographing device 341 will be described as an example of the digital still camera similar to that in Embodiment 1. Numeral 330 designates the photographing optical system consisting of a plurality of lens units, which are a first lens unit 331, a second lens unit 332, and a third lens unit 333 the function of each of which is the same as each lens unit 131, 132, or 133 in the photographing device of the first embodiment of FIG. 5.

The optical element 301 is interposed between the second lens unit 332 and the third lens unit 333 and the mechanical stop mechanism 334 using a stepping motor as a driving source is placed behind the optical element 301.

The structure of the other members is the same as in Embodiment 1 and the same members will be denoted by the same reference numerals while omitting the description thereof.

In the present embodiment the mechanical stop mechanism 334 is used in addition to the optical element 301 as an optical shutter member and the reason thereof is that the fine adjustment function of light amount of photographing light and the switching function between transmission and interception of light are implemented by the separate members.

Figure 14:
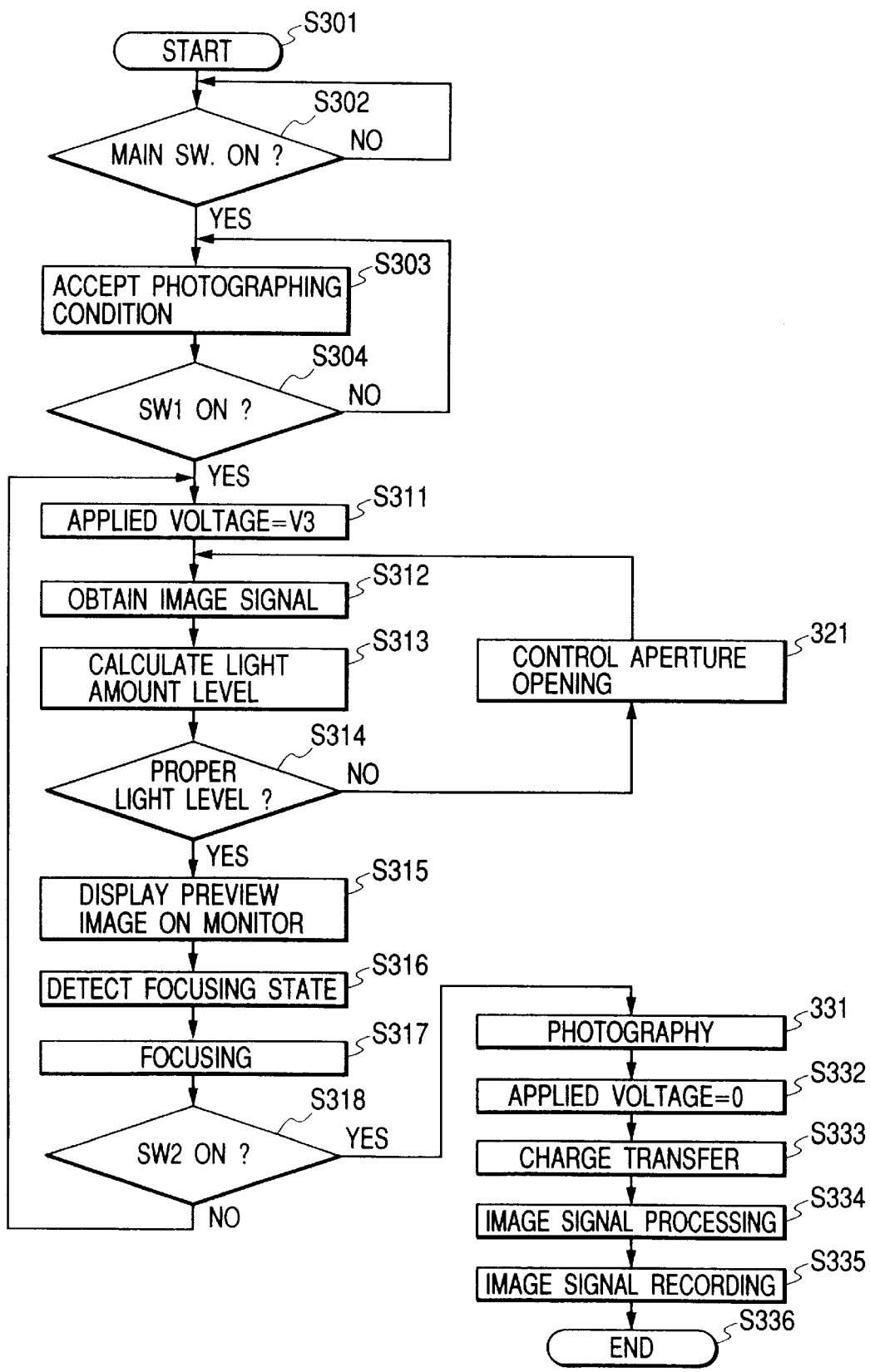
FIG. 14 is a control flowchart of the photographing device incorporating the optical element of Embodiment 3.

FIG. 14 is a control flowchart of the CPU 342 in the photographing device 341 illustrated in FIG. 13.

The control flow of the photographing device 341 will be described below referring to FIG. 13 and FIG. 14.

Through step S301, the CPU goes to step S302 to determine whether the photographer switches the main switch on. While the main switch is off, the CPU stays at step S302.

When it is determined in step S302 that the main switch becomes on, the CPU 342 leaves the sleep state to execute the processes in and after step S303.

In step S303 the CPU accepts the photographing conditions set by the photographer. Specifically, the photographer sets the exposure control mode (shutter priority AE, program AE, etc.), the autofocus mode (one shot AF, continuous AF, etc.), the drive mode (single shot, continuous shots, etc.), the image quality mode (the number of recording pixels used, the image compression rate selected, etc.) and so on by use of the monitor 151 and the control switches 152.

In step S304 it is determined whether the photographer switches the photograph preparation switch (indicated by SW1 in the flowchart) on. While the photograph preparation switch is off, the CPU goes back to step S303 to accept the setting of the photographing conditions repeatedly. When it is determined in step S304 that the photograph preparation switch becomes on, the CPU leaves step S304 to execute the processes in and after step S311.

In step S311, the output voltage of the power supply means 144 is controlled to V3 to apply the voltage V3 to the optical element 301. Then the transmittance of the optical element 301 becomes maximum, that is, the optical switch goes into the open state, as explained with FIG. 12, so as to allow the photograph light to pass through the photographing optical system. In step S312 the image pickup means 134 and signal processing circuit 145 are actuated to capture the preview image.

In step S313 the CPU determines the light amount level of the preview image thus captured in step S312. Specifically, the CPU calculates maximum, minimum, and average output signal levels among the pixel signals outputted from the image pickup means 314 and determines the light amount of incident light to the image pickup means 134. In step S314 it is determined whether the light amount level determined in step S313 above is proper.

When it is determined in this step that the light amount level is proper, the CPU goes to step S315.

In step S315 the preview image captured in step S312 is displayed on the monitor 151. In next step S316 the focus condition of the photographing optical system 330 is detected by the focus detector 154.

In next step S317, the CPU makes the focus driver 155 move the first lens unit 331 back and forth in the optical-axis directions to perform the focusing operation.

After that, the CPU goes to step S318 to determine whether the photograph switch (indicated by SW2 in the flowchart) is switched on. While the photograph switch is off, the CPU returns to step S311 to repeatedly carry out the steps from the acquisition of preview image to the focusing.

On the other hand, when it is determined in step S314 that the light amount level determined in step S313 above is not proper, the CPU jumps to step S321. In step S321 the CPU compares the actual light amount level with the proper light amount level and increases or decreases the aperture diameter of the stop means 334 in the photographing optical system 330.

After execution of step S321, the CPU goes back to step S312 to repeatedly carry out the steps from the acquisition of preview image to the stop aperture control until the light amount level of the incident light to the image pickup means 134 becomes proper.

Once the light amount level of the incident light to the image pickup means 134 becomes proper, the CPU transfers from step S314 to step S315.

When the photographer switches the photograph switch on during the repetitive execution of the photograph preparation operation as described above, the CPU jumps from step S318 to step S331.

In step S331 the image pickup operation is carried out. Specifically, the object image focused on the image pickup means 134 is photoelectrically converted and the charge proportional to the intensity of the optical image is accumulated in the charge storage portion near each photoreceptive portion. In step S332 the output voltage of the power supply means 144 is controlled to zero to cancel the application of the voltage to the optical element 301.

Then the optical element 301 goes into the minimum state of transmittance, as described with FIG. 12, so as to intercept the light traveling in the photographing optical system. In step S333 the charge stored in step S331 is read out through the charge transfer line and the analog signals read out are supplied to the signal processing circuit 145.

In general, detrimental noise will be likely to occur in the image signals if light enters the photoreceptive portions during the transfer of the stored charge from the image pickup means. In the present embodiment the light is intercepted in step S332 above by the optical element 301 during the charge transfer, so that the detrimental noise can be prevented from occurring in the image.

In S334 the signal processing circuit 145 performs the A/D conversion of the analog image signals received and the image processing thereof such as the AGC control, white balance, γ correction, edge enhancement, and so on. The signal processing circuit 145 further performs the JPEG compression or the like according to the image compression program stored in the CPU 342 if necessary.

In step S335 the CPU stores the image signals obtained in step S334 above into the memory 156 and the photographing operation is complete in step S336.

Embodiment 3 described above can realize the optical element or the photographing apparatus that can present the excellent effects in terms of the following points.

The present embodiment can provide the optical shutter capable of switching between the transmission state and the interception state of light by controlling the applied voltage to the optical element.

The use of the optical element instead of the mechanical shutter mechanism of the photographing optical system permits disuse of the mechanical means such as the shutter wings, the shutter wing driving mechanism, and the like and also permits achievement of the smaller size of the photographing apparatus.

[Embodiment 4]

Embodiment 2 described previously showed the application example as an apodization filter having the gradually decreasing transmittance with increase in the incident height of the incident light to the optical element, whereas Embodiment 4 demonstrates an example of application to a transmittance-distribution-variable filter capable of presenting the transmittance distribution in which the transmittance gradually increases with increase in the incident height of the incident light to the optical element and capable of controlling the transmittance distribution to a desired profile by controlling the applied voltage to the optical element.

Figure 15A:
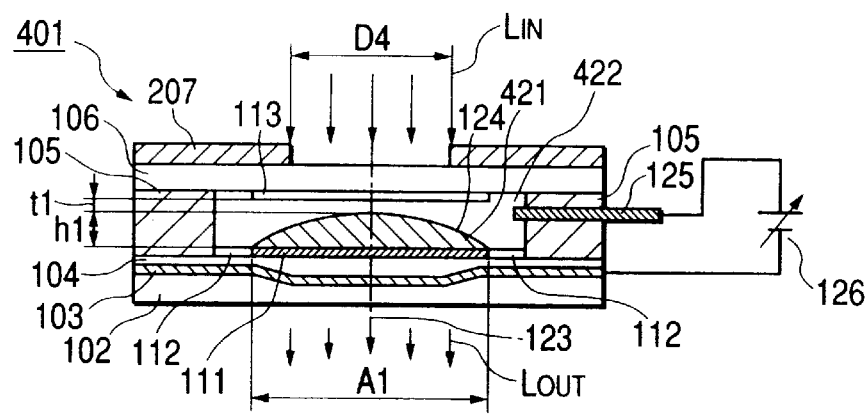
FIG. 15A, FIG. 15B, and FIG. 15C are detailed diagrams to explain the operation of an optical element of Embodiment 4.
Figure 15B:
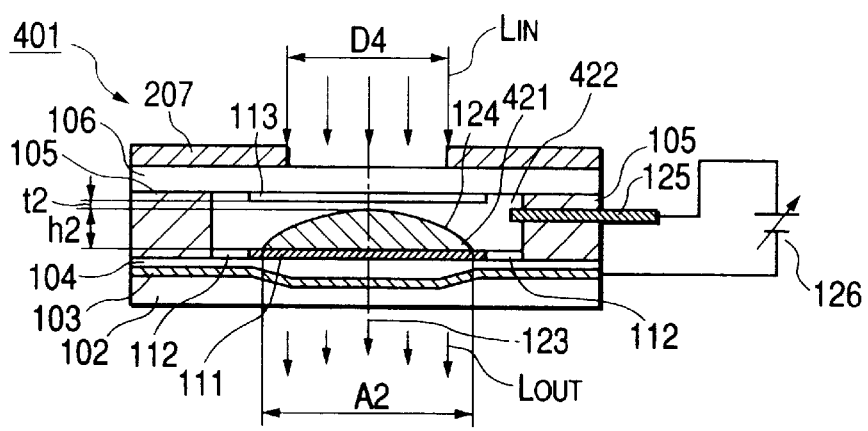
Figure 15C:
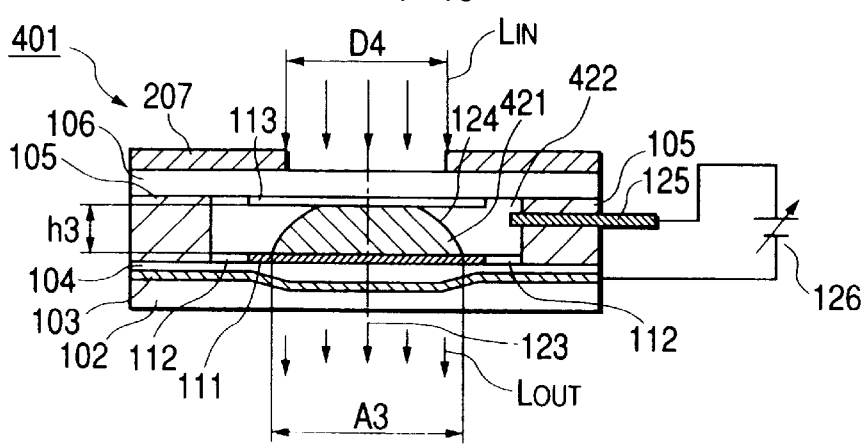

FIGS. 15A, 15B, and 15C to FIG. 18 are drawings for explaining Embodiment 4 of the present invention and FIGS. 15A to 15C are diagrams for detailing the operation where the optical element in the present embodiment is used as a transmittance-distribution-variable filter.

The present embodiment is different from Embodiment 1 to Embodiment 3 in that the first liquid 421 and the second liquid 422 in the optical element 401 are different in their property from the liquids in the other embodiments.

First, the second liquid 122 contained the water-soluble dye in Embodiment 1 to Embodiment 3, whereas the second liquid 422 of the present embodiment does not contain the dye and is thus transparent. Further, the first liquid 121 was transparent in Embodiment 1 to Embodiment 3, whereas an oil-soluble dye is added in a predetermined concentration to the first liquid 421 in the present embodiment.

The dye is preferably one selected from chelate azo pigments and nitroso pigments.

In general, such pigments are colored in blue, yellow, red, etc., and an achromatic pigment can be obtained by mixing some of them at a predetermined ratio. The other members all have the same functions and dimensions as in Embodiment 1 to Embodiment 3. Therefore, the same portions will be denoted by the same numbers and redundant description will be avoided.

The stop 207 has the same aperture diameter D4 as the stop 207 of Embodiment 2.

FIG. 15A shows a situation in which the output voltage of the power supply means 126 connected to the optical element 401 is V1 equal to or close to zero. The shape of the interface 124 at this time is the same as in FIG. 7A, the diameter of the bottom surface of the droplet of the first liquid 421 is A1, and the height is h1. The thickness on the optical axis of the second liquid 422 is t1. $L_{IN}$ represents the light coming from above the optical element 401 and entering the aperture of the stop 207, and $L_{OUT}$ the light emerging from the optical element 401.

Since the first liquid 421 exhibiting the lens shape has the predetermined light absorptive power in the present embodiment, the light amount distribution of the output light $L_{OUT}$ is not uniform, the light transmittance is minimum on the optical axis 123, and the transmitted light amount increases with increase in the distance from the optical axis 123.

FIG. 15B shows a situation in which the output voltage of the power supply means 126 is V2 greater than V1. At this time, the diameter of the bottom surface of the droplet of the first liquid 421 is A2 and the height is h2. The average transmitted light amount is smaller than in FIG. 15A and the nonuniformity of transmitted light amount also becomes more prominent.

FIG. 15C shows a situation in which the output voltage of the power supply means 126 is V3 further greater than V2. At this time, the diameter of the bottom surface of the droplet of the first liquid 421 is reduced to A3 and the top of the interface 124 becomes flat in contact with the hydrophilic film 113 formed on the bottom surface of the cover sheet 106.

The diameter of this flat part is smaller than the diameter D4 of the aperture of the stop 207. As a result, the transmittance is uniform in the area inside the flat part and gradually increase with increase in the distance from the optical axis in the outside area. The transmittance at the incident height of zero at this time is expressed by the product of the transmittances of the transparent substrate 102, transparent electrode 103, insulating layer 104, water-repellent film 111, first liquid 421, hydrophilic film 113, and cover sheet 106, and the light absorptive power of the first liquid 421 becomes dominant.

Figure 16:
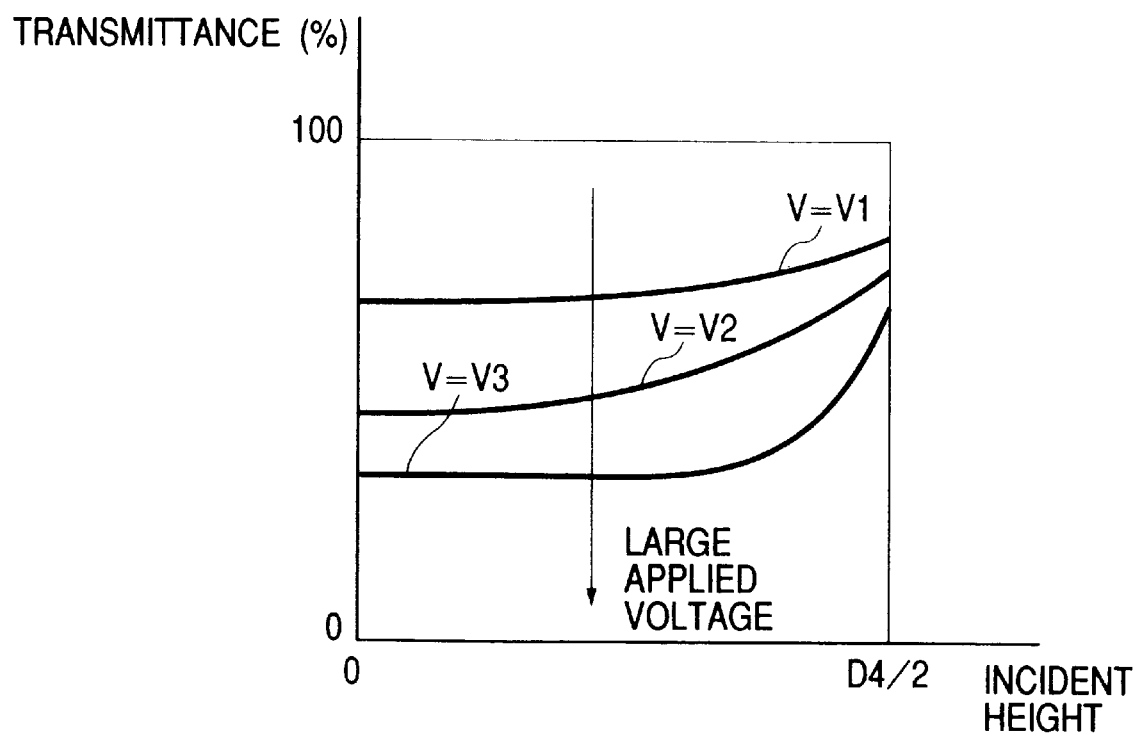
FIG. 16 is a diagram to explain the transmittance distribution of the optical element of Embodiment 4.

FIG. 16 shows the relationship of transmittance distribution against incident height (distance from the optical axis 123) of the incident light to the optical element 401, using the parameter of the applied voltage from the power supply means 126 to the optical element 401.

With increase in the applied voltage, the average transmittance decreases and absolute values of gradients increase on the transmittance curves in which the transmittance gradually increases with increase in the incident height.

Figure 17:
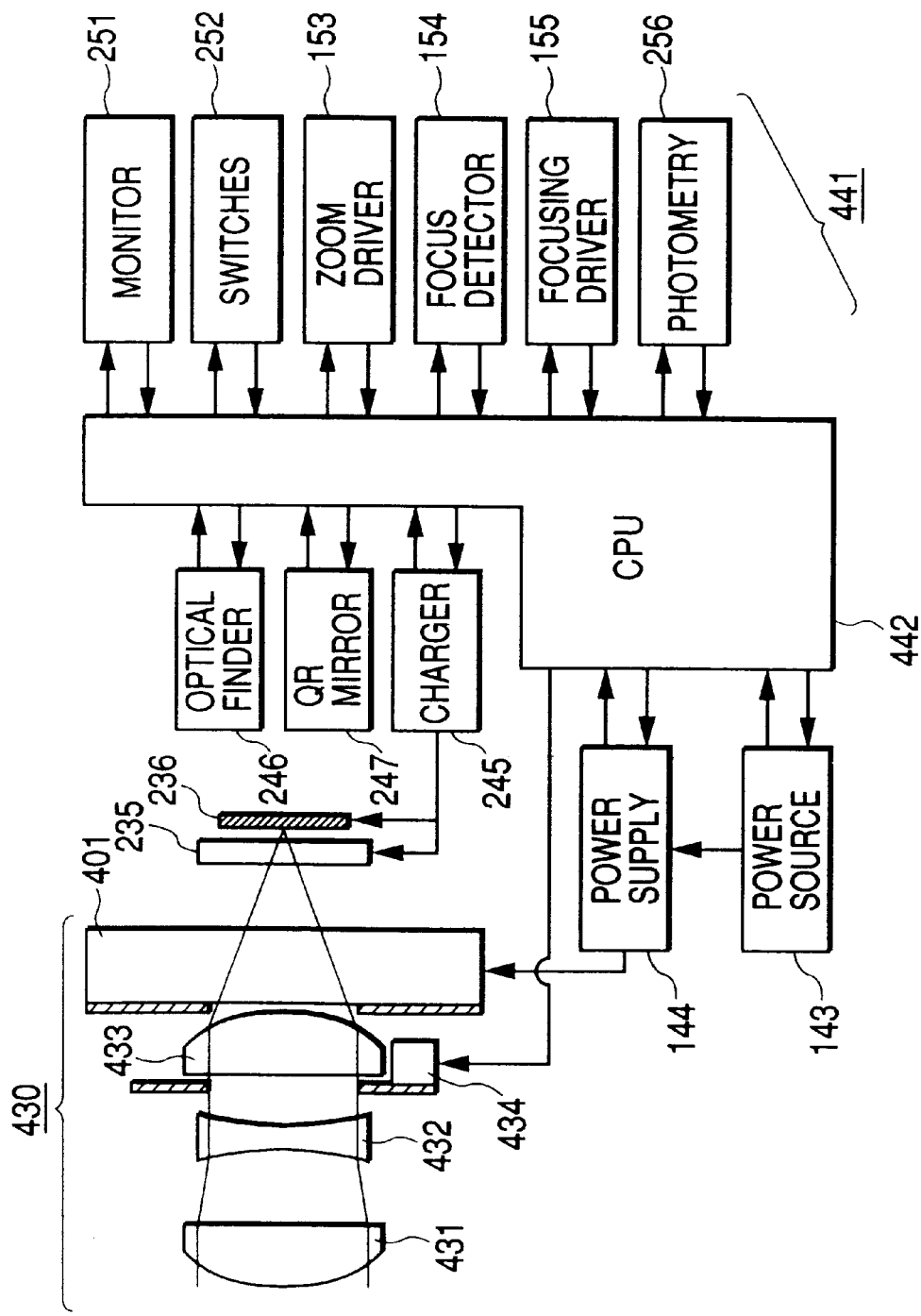
FIG. 17 is a diagram to show the structure of a photographing device incorporating the optical element of Embodiment 4.

FIG. 17 shows an application example of the optical element 401 to the photographing apparatus. In the present embodiment, the photographing device 441 will be described as an example of the so-called silver-salt still camera for recording a still image in a silver film, as in Embodiment 2.

Numeral 430 designates the photographing optical system consisting of a plurality of lens units, which are a first lens unit 431, a second lens unit 432, and a third lens unit 433, each lens having the same function but different power from each lens unit 231, 232, or 233 in the photographing device 241 in Embodiment 2 of FIG. 9.

The mechanical stop mechanism 434 using the stepping motor as a driving source is interposed between the second lens unit 432 and the third lens unit 433, and the optical element 401 is placed behind the third lens unit 433. The silver film 236 is disposed at the position of the focal point of the photographing optical system 430 and the focal-plane shutter 235 is placed immediately before the silver film. The other structure is the same as in the photographing device 241 of Embodiment 2 and the description thereof is omitted herein.

Next, the action of the optical element 401 in the present embodiment will be described. The illuminance of the object image formed on the film 236 by the photographing optical system 430 demonstrates the so-called marginal light amount decrease phenomenon in which the illuminance is high in the center and decreases with the distance from the center. Amounts of the decrease in the marginal light amount at this time are substantially uniquely determined by the zoom condition and stop condition of the photographing optical system. On the other hand, the transmittance distribution against the incident height of the optical element 401 is uniquely determined by the applied voltage, as described referring to FIG. 16.

Therefore, the marginal light amount decrease of the image on the film surface 236 can be properly compensated for by placing the optical element 401 at an appropriate position in the photographing optical system and providing the optical element 401 with the transmittance distribution for compensation for the marginal light amount decrease determined by the zoom condition and the stop condition. Specifically, experiments are conducted on the occasion of production of the photographing device 441 to determine the marginal light amount decrease data according to each of zoom conditions and stop conditions and determine the optimum applied voltage to the optical element 401 for compensation for it.

Then the applied voltages according to the respective zoom conditions and stop conditions are stored in the form of a look-up table in the ROM in the CPU 442 and the applied voltage to the optical element 401 is controlled by reading a value from the table during photography.

Figure 18:
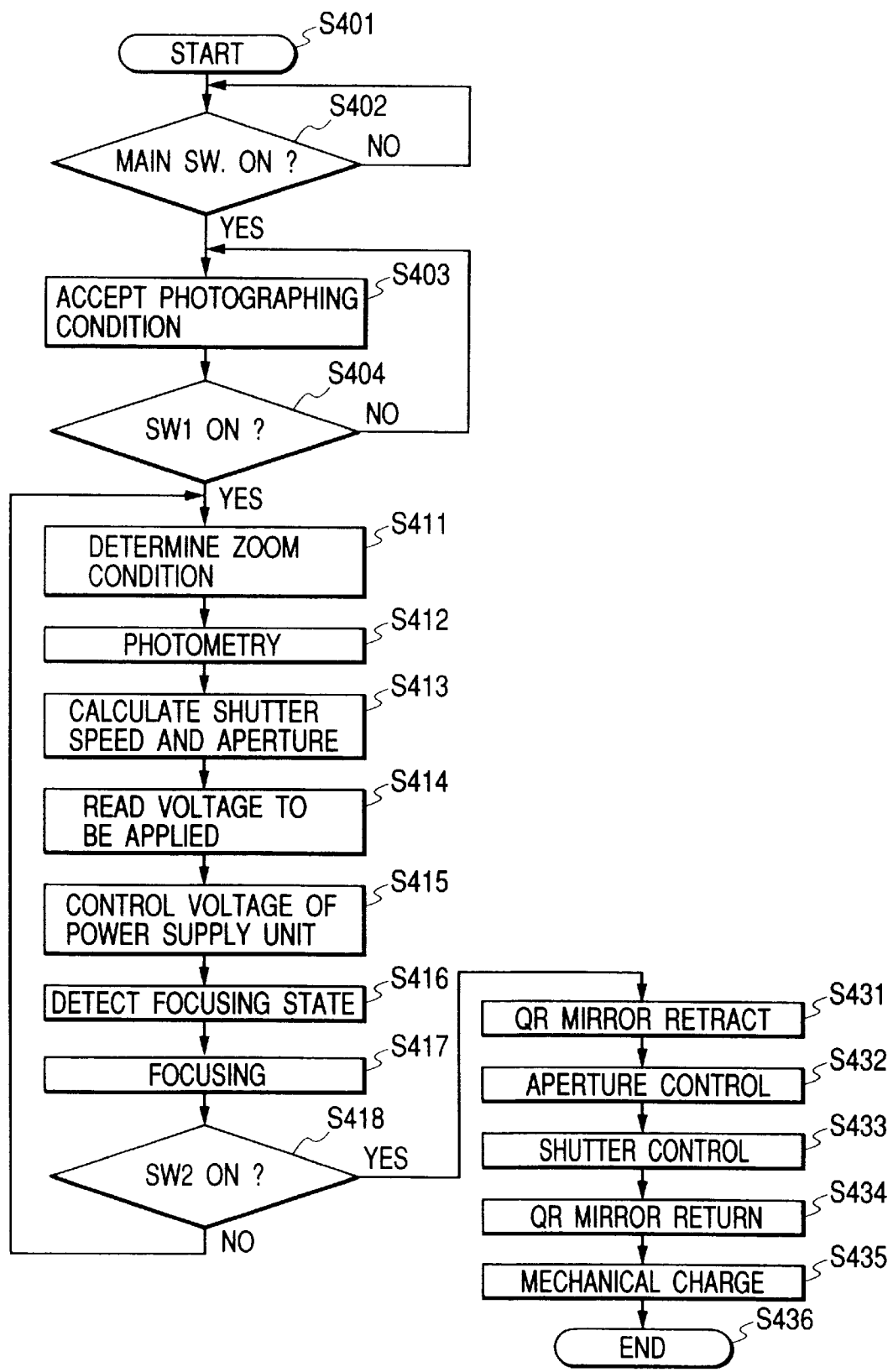
FIG. 18 is a control flowchart of the photographing device incorporating the optical element of Embodiment 4.

FIG. 18 is a control flowchart of the CPU 442 in the photographing device 441 illustrated in FIG. 17.

The control flow of the photographing device 441 will be described below referring to FIG. 17 and FIG. 18.

Through step S401, the CPU goes to step S402 to determine while the photographer switches the main switch on. While the main switch is off, the CPU stays at step S402.

When it is determined in step S402 that the main switch becomes on, the CPU 442 leaves the sleep state to execute the processes in and after step S403.

In step S403 the CPU accepts the photographing conditions set by the photographer. Specifically, the photographer sets the exposure control mode (shutter priority AE, program AE, etc.), the autofocus mode (one shot AF, continuous AF, etc.), the drive mode (single shot, continuous shots, etc.) and so on by use of the monitor 251 and the control switches 252.

In step S404 it is determined whether the photographer switches the photograph preparation switch (indicated by SW1 in the flowchart) on. While the photograph preparation switch is off, the CPU goes back to step S403 to accept the setting of the photographing conditions repeatedly. Once it is determined in step S404 that the photograph preparation switch becomes on, the CPU leaves step S404 to execute the processes in and after step S411.

In step S411 the CPU determines the zoom condition of the photographing optical system 430.

In step S412 the object luminance is detected by the photometry means 256. In step S413 the CPU calculates the shutter speed and aperture upon photography, based on the object luminance detected and the program chart stored in the ROM.

In step S414, the CPU reads the voltage to be applied to the optical element 401 out of the look-up table stored in the ROM, based on the zoom condition of the photographing optical system 430 determined in step S411 above and the aperture upon photography computed in step S413.

In step S415, the voltage thus read in step S414 above is supplied from the power supply means 144 to the optical element 401. As a result, compensation is effected for the marginal light amount decrease of the photographing optical system 430.

In step S416 the focus condition of the photographing optical system 430 is detected by the focus detector 154.

In next step S417, the CPU makes the focus driver 155 move the first lens unit 431 back and forth in the optical-axis directions to perform the focusing operation. After that, the CPU goes to step S418 to determine whether the photograph switch (indicated by SW2 in the flowchart) is switched on.

While the photograph switch is off, the CPU goes back to step S411 to carry out the steps from the zoom condition determination to the focusing repeatedly.

When the photographer switches the photograph switch on during the repetitive execution of the photograph preparation operation as described above, the CPU jumps from step S418 to step S431. In step S431 the quick return mirror 427 is retracted out of the photograph light.

In step S432 the stop 434 is controlled based on the aperture calculated in step S413.

In step S433, the focal-plane shutter 425 is actuated and controlled, based on the shutter speed calculated in step S413. In step S434, the quick return mirror 247 is returned into the photograph light and the stop 434 is also returned into the open state.

In step S435 the charger 245 is actuated to charge the focal-plane shutter 235 into the initial state (wing-movable state) and the film 236 is wound up by one frame. The photographing operation is complete in step S436.

Embodiment 4 described above can realize the optical element or the photographing apparatus that can present the excellent effects in the following points.

The present embodiment can provide the transmittance-distribution-variable filter that can implement the transmittance distribution in which the transmittance gradually increases with increase in the incident height of the incident light to the optical element and that can control the transmittance distribution to a desired profile by controlling the applied voltage to the optical element.

The present embodiment can provide the photographing apparatus that can capture a high-quality image while decreasing the marginal light amount decrease of the photographing optical system, by placing the optical element at the predetermined position of the photographing optical system.

As described above, Embodiments 1 to 4 can provide the optical elements capable of efficiently and freely varying the transmittance of incident light by making use of the electrowetting phenomenon, without use of the mechanical structure, and can realize the optical elements or the photographing apparatus in the compact and simple structure and in the different methods from those of the conventional elements and apparatus.

Next, embodiments of the optical switch capable of changing the optical path (traveling direction) of incident light will be described below, but it is noted that the present invention is by no means intended to be limited to these embodiments.

[Embodiment 5]

Figure 19A:
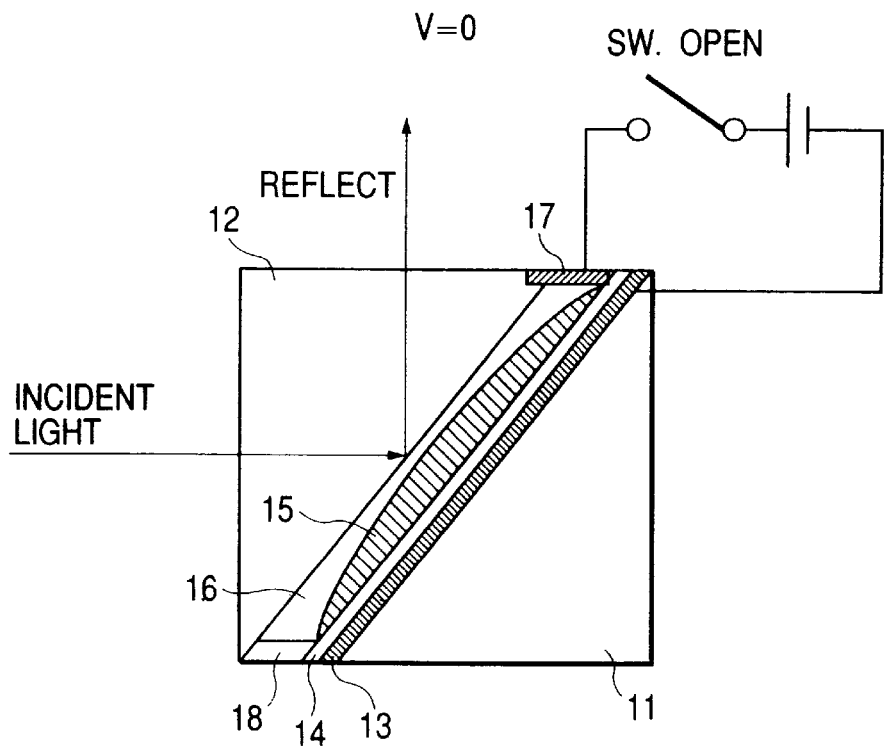
FIG. 19A and FIG. 19B are cross-sectional views of an optical switch in Embodiment 5.
Figure 19B:
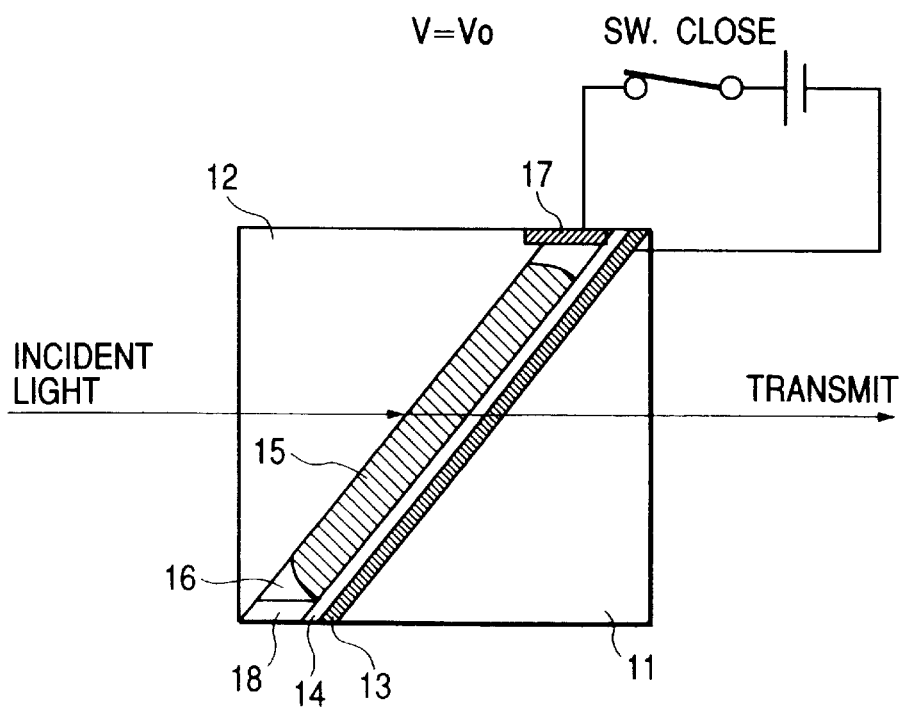

FIGS. 19A and 19B are cross-sectional views of the optical switch in Embodiment 5 of the present invention.

In the figures, the optical switch of the present embodiment is composed of a first prism 11 as a support, a second prism 12, a transparent, electroconductive electrode 13 as a first electrode, an insulating layer 14, a first liquid 15 and an electrolyte solution 16 as an electroconductive, second liquid, the liquids being confined in a sealed space created between the prisms 11 and 12, and an opposed electrode 17 as a second electrode.

The prisms 11, 12 made of an optical material having the refractive index $n_P$ are rectangular prisms and the electrode 13 is the transparent, electroconductive electrode of ITO or the like formed on the prism 11, for example, by sputtering or by the Electron Beam method.

The transparent insulating layer 14 is formed in the thickness of about 20 $\mu$m on the electrode 13 by dropping the replica resin (model number C001 available from Dai Nippon Printing Co., Ltd.) onto the transparent, electroconductive electrode 13, pressing a glass sheet thereonto, and thereafter exposing it to UV light for fifteen minutes.

The refractive indexes of the transparent, electroconductive electrode 13 and the insulating layer 14 are desirably equal to that $n_P$ of the prisms 11 and 12.

The first liquid 15 of silicone oil TSF437 (available from Toshiba Silicones Co., Ltd.) and the electrolyte solution 16 of NaCl aqueous solution (3.0 wt %) the specific gravity of which is adjusted to be substantially equal to that of the first liquid 15 are confined between the prism 11 with the transparent, conductive electrode 13 and the insulating layer 14 formed thereon, and the prism 12. The specific gravity of the electrolyte solution 16 is preferably equal to that of the first liquid 15 within the scope of ±10%, and the equality in this range is regarded as "substantially equal" in the present specification. The contribution of the gravity to the shape of the interface between the two liquids can be eliminated by equalizing the specific gravities of the first liquid 15 and the electrolyte solution 16 as described above.

It is necessary to pay attention to avoiding contact between the first liquid 15 and the prism 12 during the confining operation of the first liquid 15 and the electrolyte solution 16 between the prisms 11 and 12. For preventing leakage of the first liquid 15 and the electrolyte solution 16 thus confined, the space between the prisms 11 and 12 is sealed by the opposed electrode 17 and the sealant 18 such as a glass sheet or the like.

The refractive index $n_A$ of the electrolyte solution 16 is desirably set to satisfy the condition of total reflection against the refractive index $n_P$ of the prisms 11, 12 ($n_P \gg n_A$).

The first liquid 15 is a liquid immiscible with the electrolyte solution 16; e.g., silicone oil or the like, and the refractive index $n_B$ of the first liquid 15 is desirably substantially equal to that $n_P$ of the prisms 11, 12 ($n_P \cong n_B$).

In the state of V=0 where no voltage is applied to the electrolyte solution 16, i.e., where no voltage is placed between the transparent, conductive electrode 13 and the opposed electrode 17 of nickel (FIG. 19A), only the electrolyte solution 16 is in contact with the prism 12, and the refractive index $n_A$ of the electrolyte solution 16 and the refractive index $n_P$ of the prism 12 satisfy the condition of total reflection. Therefore, the incident light is totally reflected at the interface between the prism 12 and the electrolyte solution 16.

When a voltage is placed between the transparent, conductive electrode 13 and the opposed electrode 17 of nickel (FIG. 19B), i.e., when V=$V_0$, the interfacial tension varies between the first liquid 15 and the electrolyte solution 16 to deform the interface, and the first liquid 15 goes into contact with the prism 12. Since the refractive index $n_B$ of the first liquid 15 is equal to that $n_P$ of the prism 11 and the prism 12, the incident light travels through them. On this occasion, the volume of the first liquid 15 is always constant, independent of the voltage applied to the two electrodes.

The prisms 11, 12 are the rectangular prisms and are made of a material selected from glasses or plastics such as polytetrafluoroethylene, polycarbonate, and acrylic resin. The indexes of the transparent, conductive electrode 13 and the insulating layer 14 are desirably equal to that $n_P$ of the prisms 11 and 12. The transparent, conductive electrode 13 can be made of a conductive, transparent material, such as ITO, tin oxide, or the like. The insulating layer 14 can be a layer of acrylic resin formed by the replica method, or a layer of polytetrafluoroethylene or another fluorine-treated polymer deposited by sputtering or by chemical vapor deposition. The electrolyte solution 16 confined between the prisms 11, 12 can be an aqueous solution of an electrolyte such as NaCl, $Na_2SO_4$, or the like, or a polar liquid such as water, alcohol, acetone, formamide, or ethylene glycol, or a mixture of either of such polar liquids with another appropriate liquid.

The refractive index $n_A$ of the electrolyte solution 16 is desirably set to satisfy the condition of total reflection against that $n_P$ of the prisms 11, 12.

The first liquid 15 is the liquid immiscible with the electrolyte solution 16, for example, like silicone oil. The opposed electrode 17 can be made of a material selected from gold, platinum, stainless steel, nickel, silver, and indium/tin oxide and can be formed in the flat-plate or rodlike shape as long as it is in contact with the electrolyte solution 16. The sealant 18 can be made of a material selected from glasses, acrylic resin, and metals and can be formed in the flat-plate, circular, or rodlike shape as long as it can seal the space between the prisms.

In FIGS. 19A and 19B one opening of the space is sealed by the opposed electrode 17 while the other opening by the sealant 18 of a glass sheet, but the both openings may also be sealed by the glass sheet.

Embodiment 5 is the optical switch for switching the optical path on the side of the first prism 11, whereas a modification of Embodiment 5 can be an optical switch for switching the optical path on the second prism side. In the modification, the first prism is not a transparent body but an opaque body with a light-absorbing property. When the voltage is placed between the transparent, conductive electrode and the opposed electrode 17 to bring the first liquid 15 into contact with the prism 12, the incident light becomes absorbed by the first prism, so that the light is not transmitted by the first prism.

[Embodiment 6]

Figure 20A:
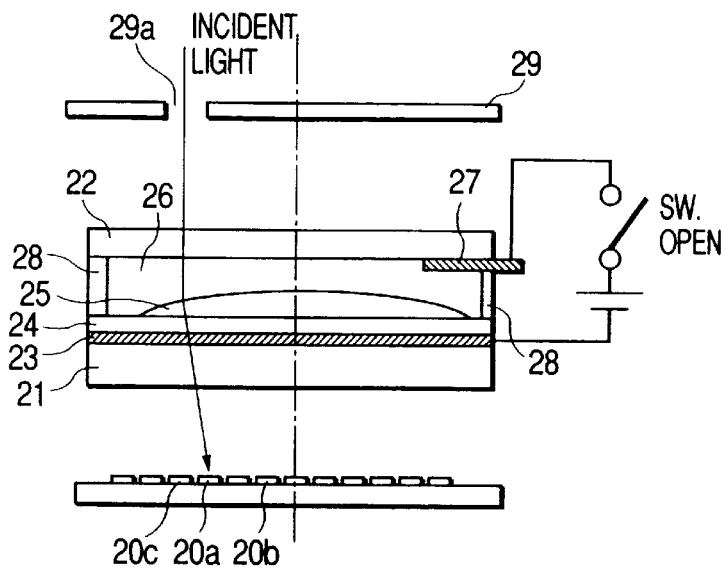
FIG. 20A, FIG. 20B, and FIG. 20C are cross-sectional views of an optical switch in Embodiment 6.
Figure 20B:
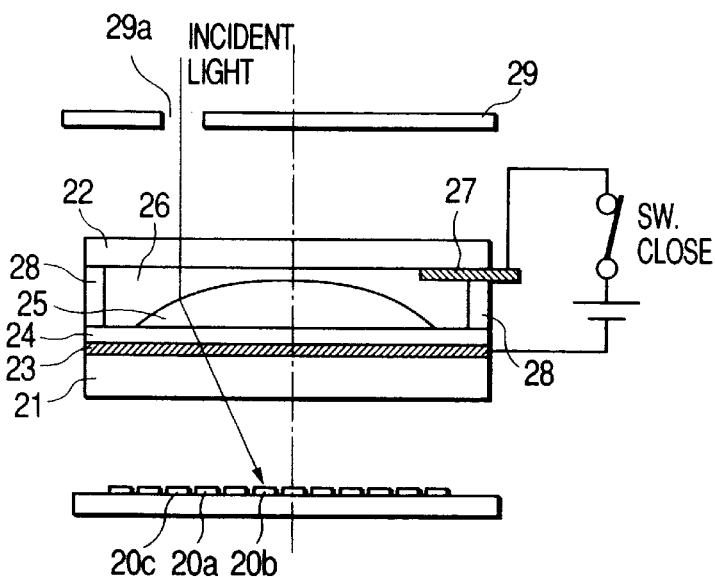
Figure 20C:
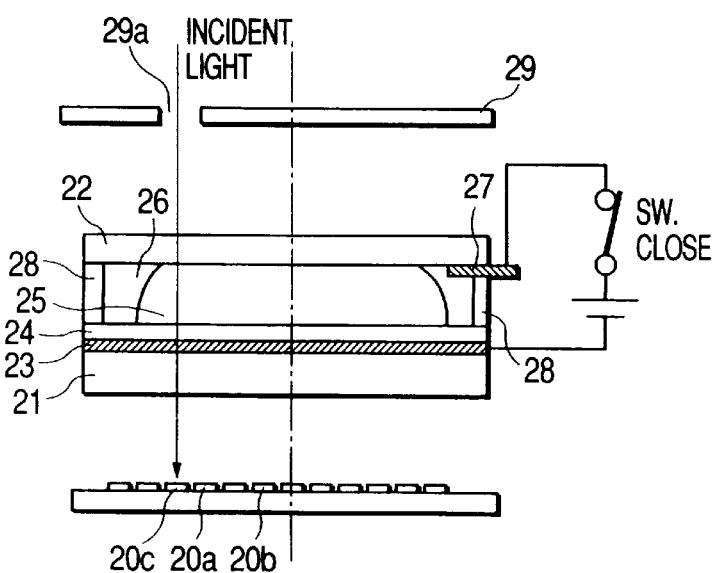

FIGS. 20A to 20C are cross-sectional views of the optical switch in Embodiment 6 of the present invention.

In the figures, the optical switch of the present embodiment is composed of first and second substrates 21, 22, a transparent, electroconductive electrode 23 as a first electrode, an insulating layer 24, a first liquid 25 and an electrolyte solution 26 as a second liquid, the two liquids being confined between the substrates 21 and 22, and an opposed electrode 27.

The substrates 21, 22 are made of an optical material having the refractive index $n_P$, and the electrode 23 is a transparent, electroconductive electrode of ITO or the like formed on the substrate 21, for example, by sputtering or by the Electron Beam method.

The transparent insulating layer 24 is formed in the thickness of about 20 μm on the electrode 23 by dropping the replica resin (model number COO1 available from Dai Nippon Printing Co., Ltd.) onto the transparent, conductive electrode 23, pressing a glass sheet thereonto, and thereafter exposing it to UV light for fifteen minutes.

The refractive indexes of the transparent, conductive electrode 23 and the insulating layer 24 are desirably equal to that $n_P$ of the substrates 21 and 22.

The first liquid 25 of silicone oil TSF437 (available from Toshiba Silicones Co., Ltd.) and the electrolyte solution 26 of NaCl aqueous solution (3.0 wt %) adjusted so that the specific gravity thereof is substantially equal to that of the first liquid 25 are confined between the substrate 21 with the transparent, conductive electrode 23 and the insulating layer 24 formed thereon, and the substrate 22. It is necessary to pay attention to avoiding contact between the first liquid 25 and the substrate 22 on the occasion of confining the first liquid 25 and the electrolyte solution 26. The space between the substrates 21, 22 is sealed by the sealant 28 of the glass sheet or the like in order to avoid leakage of the first liquid 25 and the electrolyte solution 26 thus confined.

The first liquid 25 is the liquid immiscible with the electrolyte solution 26, e.g., like silicone oil.

The refractive index nB of the electrolyte solution 26 is desirably equal to that $n_P$ of the substrates 21, 22 ($n_P \cong n_B$).

In the state of V=0 (V) where no voltage is placed between the transparent, conductive electrode 23 and the opposed electrode 27 of nickel (FIG. 20A), the electrolyte solution 26 is in contact with the substrate 22. The refractive index of the first liquid 25 is 1.49, and the refractive index of the electrolyte solution 36 is 1.34. Therefore, the incident light passing through a slit 29a of a slit sheet 29 is refracted at the interface between the first liquid 25 and the electrolyte solution 26 to reach a photoreceptive portion 20a on a photoreceptive sensor substrate 20.

When a voltage is placed between the transparent, conductive electrode 23 and the opposed electrode 27 of nickel (FIG. 20B), i.e., when V=V1, the interfacial tension varies between the first liquid 25 and the electrolyte solution 26, and thus the shape of the interface is altered between the first liquid 25 and the electrolyte solution 26, so as to decrease the radius of curvature of the electrolyte solution 26. Therefore, the incident light is refracted at a larger angle to reach a photoreceptive portion 20b.

When a further higher voltage is applied (FIG. 20C), i.e., when V=V2, the first liquid 25 goes into contact with the second substrate 22 being the upper substrate. Since the refractive index $n_A$ of the first liquid 25 is equal to that $n_P$ of the substrates 21 and 22, the incident light is not refracted and thus reaches a photoreceptive portion 20c.

In this way the optical path of light can be deflected by controlling the voltage in the present embodiment. Here the difference between the refractive indexes of the first liquid 25 and the electrolyte solution 26 is desirably not less than 0.1 in order to achieve the efficient refraction of incident light.

The materials used in Embodiment 6 can be the same as in Embodiment 5.

[Embodiment 7]

Figure 21A:
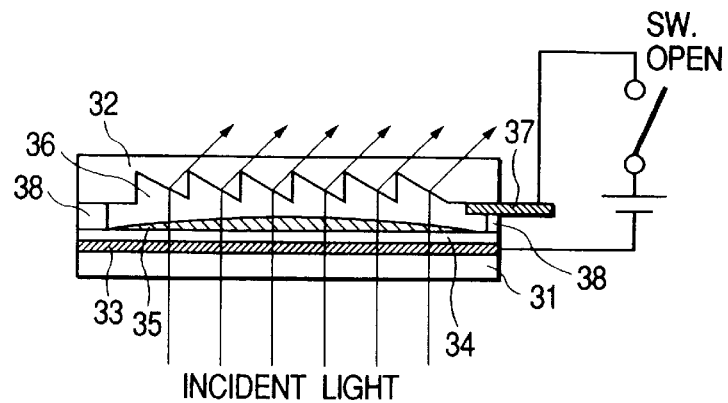
FIG. 21A and FIG. 21B are cross-sectional views of an optical switch in Embodiment 7.
Figure 21B:
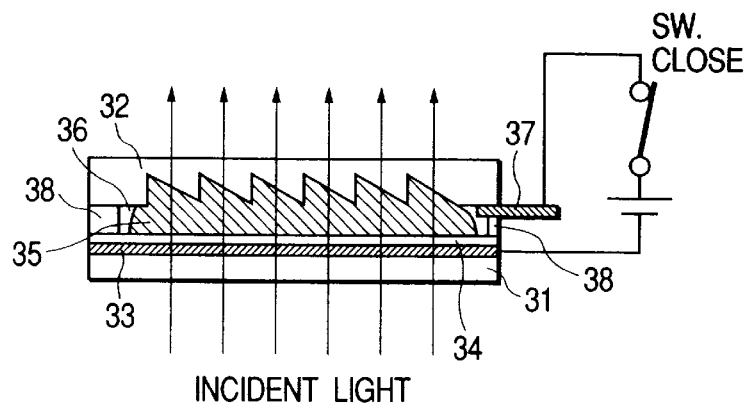
Figure 22A:
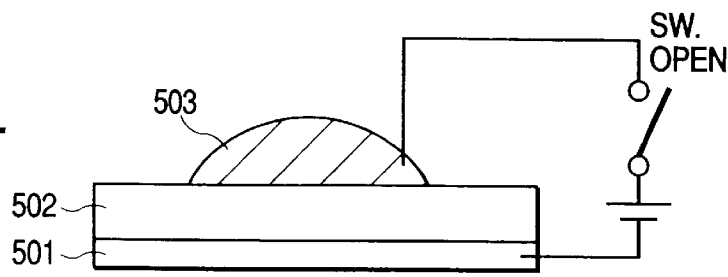
FIG. 22A and FIG. 22B are diagrams to show change of the droplet between before and after the application of voltage, for explaining the electrowetting phenomenon.
Figure 22B:
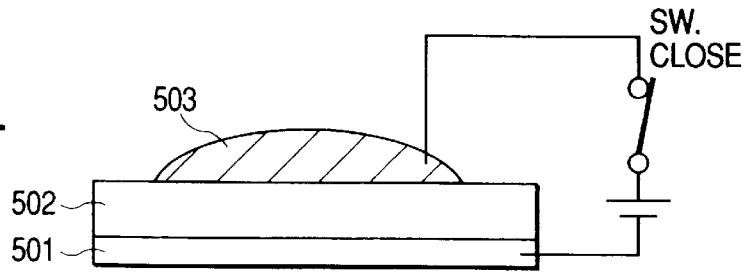

FIGS. 21A and 21B are cross-sectional views of the optical switch in Embodiment 7 of the present invention.

In the figures, the optical switch of the present embodiment is composed of first and second substrates 31, 32, a transparent, electroconductive electrode 33, an insulating layer 34, a first liquid 35 and an electrolyte solution 36 as a second liquid, the two liquids being confined between the substrates 31 and 32, and an opposed electrode 37.

The substrates 31, 32 are made of an optical material having the refractive index $n_P$ and microprisms are formed in a surface on the liquid chamber side of the substrate 32.

The electrode 33 is a transparent, electroconductive electrode of ITO or the like formed on the substrate 31, for example, by sputtering or by the Electron Beam method.

The transparent insulating layer 34 is formed in the thickness of about 20 μm on the electrode 33 by dropping the replica resin (model number C001 available from Dai Nippon Printing Co., Ltd.) onto the transparent, conductive electrode 33, pressing a glass sheet thereonto, and thereafter exposing it to UV light for fifteen minutes.

The refractive indexes of the transparent, conductive electrode 33 and the insulating layer 34 are desirably equal to the refractive index $n_P$ of the substrates 31 and 32.

The first liquid 35 of silicone oil TSF437 (available from Toshiba Silicones Co., Ltd.) and the electrolyte solution 36 of NaCl aqueous solution (3.0 wt %) adjusted so that the specific gravity thereof is equal to that of the first liquid 35 are confined between the substrate 32, and the substrate 31 with the transparent, conductive electrode 33 and the insulating layer 34 formed thereon.

It is necessary to pay attention to avoiding contact between the first liquid 35 and the prism 32 on the occasion of confining the first liquid 35 and the electrolyte solution 36. In order to avoid leakage of the first liquid 35 and the electrolyte solution 36 thus confined, the space is sealed between the substrates 31 and 32 by the sealant 38 of a glass sheet or the like. The first liquid 35 is the liquid immiscible with the electrolyte solution 36, for example, like silicone oil. The refractive index $n_A$ of the first liquid 35 is desirably equal to that $n_P$ of the substrates 31 and 32 ($n_P \cong n_A$).

When no voltage is placed between the transparent, conductive electrode 33 and the opposed electrode 37 of nickel (FIG. 21A), i.e., when V=0 (V), the electrolyte solution 36 is in contact with the substrate 32 and thus the incident light is refracted at the interface between the substrate 32 and the electrolyte solution 36. The direction of refraction can be controlled by changing the pattern of the substrate 32 on the liquid chamber side.

When a voltage is placed between the transparent, conductive electrode 33 and the opposed electrode 37 of nickel (FIG. 21B), i.e., when $V=V_0$ (V), the interfacial tension varies between the first liquid 35 and the electrolyte solution 36 to alter the shape of the interface between the first liquid 35 and the electrolyte solution 36, whereby the first liquid 35 goes into contact with the substrate 32. At this time, since the refractive index $n_A$ of the first liquid 35 is equal to the refractive index $n_P$ of the substrates 31 and 32, the incident light travels straight.

The materials used in Embodiment 7 can be the same as in Embodiment 5.

Since the optical switches described above in Embodiments 5 to 7 do not require any mechanical driving mechanism for switching of optical path, the devices can be constructed in compact size. Since the optical path is changed by making use of the electrowetting phenomenon, the switching of optical path can be achieved efficiently.

What is claimed is:

1. An optical element comprising:
    a first support and a second support; and
    a first fluid and a second fluid which are immiscible with each other, said second fluid being electroconductive or polar, said first fluid and said second fluid being confined in a sealed space created between the first support and the second support, said first fluid and said second fluid having respective light transmittances different from each other,
    wherein, by varying a voltage applied to said second fluid, the shape of an interface between said first fluid and said second fluid is altered, so as to change an amount of light passing through said optical element.

2. The optical element according to claim 1, further comprising:
    a first electrode kept in an electrically insulated state from said second fluid; and
    a second electrode kept in an electrically conducting state to said second fluid,
    wherein the shape of the interface between said first fluid and said second fluid is altered by varying the voltage applied between said first electrode and said second electrode.

3. The optical element according to claim 1, wherein the amount of the light passing through said optical element is changed substantially uniformly, independent of positions of the light passing through said optical element.

4. The optical element according to claim 3, further comprising:
    a stop having an aperture of predetermined shape, wherein optical path lengths of rays passing through the aperture of said stop inside said first liquid and said second fluid are substantially equal to each other, independent of positions of the rays passing through said aperture.

5. The optical element according to claim 1, wherein the amount of the light passing through said optical element is changed in a desired distribution according to positions of the light passing through said optical element.

6. The optical element according to claim 5, further comprising:
    a stop having an aperture of predetermined shape, wherein optical path lengths of rays passing through the aperture of said stop inside said first liquid and said second fluid differ depending upon positions of the rays passing through said aperture.

7. The optical element according to claim 1, wherein said first fluid is placed on a substrate having the water-repellent property.

8. The optical element according to claim 1, wherein at least one of said first and second fluids has the light absorbing property.

9. The optical element according to claim 1, wherein specific gravities of said first fluid and said second fluid are substantially equal to each other.

10. An optical device comprising:
    an optical system for guiding light from an object to a predetermined position; and
    an optical element for changing an amount of light passing through said optical system, said optical element including a first fluid and a second fluid immiscible with each other, said second fluid being electroconductive or polar,
    wherein, by varying a voltage applied to said second fluid, the shape of an interface between said first fluid and said second fluid is altered so as to change the optical path length of the first fluid and the second fluid along the incident light entering said optical element.

11. An optical element comprising:
    a first support and a second support; and
    a first fluid and a second fluid immiscible with each other, said second fluid being electroconductive or polar, said first fluid and said second fluid being confined in a sealed space created between the first support and the second support,
    wherein, by varying a voltage applied to said second fluid, the shape of an interface between said first fluid and said second fluid is altered, so as to change an optical path of incident light entering said optical element.

12. The optical element according to claim 11, further comprising:
    a first electrode kept in an electrically insulated state from said second fluid; and
    a second electrode kept in an electrically conducting state to said second fluid,
    wherein the shape of the interface between said first fluid and said second fluid is altered by varying the voltage applied between said first electrode and said second electrode.

13. The optical element according to claim 11, wherein said first fluid, which is spaced through said second fluid from said second support in a state in which no voltage is applied to said second fluid, is brought into contact with said second support by applying the voltage to said second fluid, whereby the reflectance is varied at an interface between said second support and said sealed space, so as to change the optical path of the incident light entering said second support.

14. The optical element according to claim 13, wherein a difference between a refractive index of said second fluid and a refractive index of said second support satisfies the total reflection condition for said incident light.

15. The optical element according to claim 13, wherein said first support is an opaque body having the light absorbing property.

16. The optical element according to claim 11, wherein said first fluid, which is spaced through said second fluid from said second support in a state in which no voltage is applied to said second fluid, is brought into contact with said second support by applying the voltage to said second fluid, whereby said incident light is made to travel straight through the optical element.

17. The optical element according to claim 11, wherein microprisms are formed at predetermined pitches on the said space side of said second support and wherein said first fluid, which is spaced through said second fluid from said microprisms in a state in which no voltage is applied to said second fluid, is brought into contact with said microprisms by applying the voltage to said second fluid, whereby said incident light is made to travel straight through the optical element.

18. The optical element according to claim 11, wherein specific gravities of said first fluid and said second fluid are substantially equal to each other.

19. The optical element according to claim 11, wherein said second support and said first fluid have respective indexes of refraction substantially equal to each other.

20. The optical element according to claim 11, wherein a difference between refractive indexes of said first fluid and said second fluid is not less than 0.1.

* * * * *

UNITED STATES PATENT AND TRADEMARK OFFICE
CERTIFICATE OF CORRECTION

PATENT NO. : 6,449,081 B1
DATED : September 10, 2002
INVENTOR(S) : Onuki et al.

It is certified that error appears in the above-identified patent and that said Letters Patent is hereby corrected as shown below:

Column 4,
Line 24, delete "Ill" and insert therefor -- 111 --

Column 22,
Line 6, delete "nB" and insert therefor -- $n_B$ --

Signed and Sealed this

Twenty-fifth Day of February, 2003

JAMES E. ROGAN
*Director of the United States Patent and Trademark Office*